(12) United States Patent
Tsai et al.

(10) Patent No.: US 8,531,786 B2
(45) Date of Patent: Sep. 10, 2013

(54) OPTICAL SYSTEM FOR IMAGING PICKUP

(75) Inventors: Tsung-Han Tsai, Taichung (TW); Hsin-Hsuan Huang, Taichung (TW)

(73) Assignee: Largan Precision Co., Taichung (TW)

( * ) Notice: Subject to any disclaimer, the term of this patent is extended or adjusted under 35 U.S.C. 154(b) by 21 days.

(21) Appl. No.: 13/338,754

(22) Filed: Dec. 28, 2011

(65) Prior Publication Data
US 2013/0021679 A1    Jan. 24, 2013

(30) Foreign Application Priority Data
Jul. 19, 2011   (TW) .............................. 100125538 A

(51) Int. Cl.
*G02B 9/60* (2006.01)
*G02B 13/18* (2006.01)
*G02B 3/02* (2006.01)

(52) U.S. Cl.
USPC .......................................... 359/764; 359/714

(58) Field of Classification Search
USPC ........................... 359/763, 764, 714, 649, 746
See application file for complete search history.

(56) References Cited

U.S. PATENT DOCUMENTS

| 7,480,105 | B2 | 1/2009 | Mori |
| 7,502,181 | B2 | 3/2009 | Shinohara |
| 2011/0310287 | A1 * | 12/2011 | Ohtsu ........................... 348/340 |

* cited by examiner

*Primary Examiner* — Alicia M Harrington
(74) *Attorney, Agent, or Firm* — Wang Law Firm, Inc.; Li K. Wang; Stephen Hsu

(57) ABSTRACT

An optical system for imaging pickup includes, sequentially arranged from an object side to an image side: the first lens element with positive refractive power having a convex image-side surface, the second lens element with refractive power having a concave image-side surface, the third lens element with refractive power, the fourth lens element with refractive power having both object-side and image-side surfaces being aspheric, and the fifth lens element with negative refractive power having a concave image-side surface, and both object-side and image-side surfaces being aspheric. By such arrangements, the optical system for imaging pickup satisfies conditions related to shorten the total length and to reduce the sensitivity for use in compact cameras and mobile phones with camera functionalities.

22 Claims, 14 Drawing Sheets

OPTICAL SYSTEM FOR IMAGING PICKUP

BACKGROUND OF THE INVENTION

1. Field of the Invention

The present invention relates to an optical system for imaging pickup, and more particularly to the optical system for imaging pickup to shorten total length and improve image quality for applying to electronic products.

2. Description of the Related Art

In compact electronic products such as digital still cameras or mobile phone cameras, an optical system for imaging pickup is generally installed for capturing images of an object, and the optical system for imaging pickup tends to be developed with a compact design and a low cost, while meeting the user requirements of good aberration correction ability, high resolution, and high image quality.

In general, a conventional optical system for imaging pickup of a compact electronic product comes with different designs, including the two-lens, three-lens, four-lens, and five-or-more lens designs. However, if the imaging quality is taken into consideration, the optical system for imaging pickup with the four-lens or five-lens designs has advantages on image aberration and modulation transfer function (MTF) performance, wherein the five-lens design having a higher resolution than the four-lens and five-lens designs thus being applicable for electronic products requiring the high quality and high pixels.

In various compact designs of the five-lens optical system for imaging pickup having a fixed focal length, the prior art adopts different combinations of positive and negative refractive powers as disclosed in U.S. Pat. No. 7,480,105, adopting the first lens element with negative refractive power and the second lens element with positive refractive power are used. Due to the two cemented glass lens elements, the manufacturing cost is higher which is unfavorable to the cost control in mass production. In addition, the glass lens element generally is thicker than the plastic lens element, and it is difficult to make an aspheric surface of the glass lens element and reduce the total length of the optical system. If the first lens element with negative refractive power is used, it will be more difficult to reduce the total length of the optical system.

In products such as compact digital cameras, web cameras, and mobile phone cameras, the optical system for imaging pickup requires a compact design, a short focal length, and a good aberration correction. As disclosed in U.S. Pat. No. 7,502,181, the fourth lens element with negative refractive power and the fifth lens element with negative refractive power are adopted to increase the back focal length and the total length of the optical imaging system, so that it is difficult to shorten the total length of the optical imaging system. In various five-lens designs of the optical system for imaging pickup with a fixed focal length, the first lens element has a convex image-side surface to facilitate a good balance between an increase of the view angle of the optical imaging system and the effect of the aberration correction, or the fourth lens element and the fifth lens element with different refractive powers are adopted, and the fourth lens element or the fifth lens element has an inflection point, but such optical system for imaging pickup fails to meet the requirements for a good aberration and a reduced total length of the optical imaging system. The present invention provides a more practical design for shortening the optical imaging system, adopting a combination of refractive powers of five lens elements, convex and concave optical surfaces. Wherein the fourth and fifth lens elements have positive refractive power and negative refractive power respectively, and this complementary combination with a telecentric effect is favorable for reducing the back focal length and the total length of the optical system for imaging pickup effectively as well as further improving the image quality and applying the optical imaging lens assembly to compact electronic products.

SUMMARY OF THE INVENTION

Therefore, it is a primary objective of the present invention to provide an optical system for imaging pickup, sequentially arranged from an object side to an image side, comprising: the first lens element, the second lens element, the third lens element, the fourth lens element, and the fifth lens element, wherein, the first lens element with positive refractive power has a convex image-side surface; the second lens element with refractive power has a concave image-side surface; the third lens element has refractive power; the fourth lens element with refractive power has both object-side and image-side surfaces being aspheric; the fifth lens element with negative refractive power has a concave image-side surface, both object-side surface and image-side surface being aspheric, and at least one optical surface having at least one inflection point; and the following relations are satisfied:

$$|R_1|/R_2 < -1.0; \quad (1)$$

$$0.5 < f_1/f < 1.4; \quad (2)$$

$$-1.5 < f_5/f < -0.3; \quad (3)$$

wherein, $R_1$ is a curvature radius of the object-side surface of the first lens element, $R_2$ is a curvature radius of the image-side surface of the first lens element, f is a focal length of the optical system for imaging pickup, $f_1$ is a focal length of the first lens element, and $f_5$ is a focal length of the fifth lens element.

Moreover, the present invention provides an optical system for imaging pickup, as described above, further comprising an image sensor, wherein the second lens element has negative refractive power; the fourth lens element has a convex image-side surface; and the optical system for imaging pickup satisfies one or more of the following relations in addition to the relations (1), (2) and (3):

$$0.70 < S_D/T_D < 1.15; \quad (4)$$

$$|f_2/f_3| < 1.5; \quad (5)$$

$$0.6 < \text{ImgH}/f < 1.0; \quad (6)$$

$$-2.0 < R_2/R_4 < -0.3; \quad (7)$$

wherein, $S_D$ is an axial distance between the stop and the image-side surface of the fifth lens element, $T_D$ is an axial distance between the object-side surface of the first lens element and the image-side surface of the fifth lens element, f is the focal length of the optical system for imaging pickup, $f_2$ is a focal length of the second lens element, $f_3$ is a focal length of the third lens element, $R_2$ is a curvature radius of the image-side surface of the first lens element, $R_4$ is a curvature radius of the image-side surface of the second lens element, and ImgH is half of a diagonal length of an effective photosensitive area of the image sensor.

Moreover, the present invention provides an optical system for imaging pickup, as described above, wherein the first lens element has a convex object-side surface; the second lens element has negative refractive power; the fourth lens element has a concave object-side surface and a convex image-side surface; the fourth lens element and the fifth lens element can be made of plastic; and the optical system for imaging pickup satisfies one or more of the following relations in addition to the relations (1), (2), (3) and (4):

$$0.3 < f_4/f < 0.9; \quad (8)$$

$$|R_1|/R_2 < -2.0; \quad (9)$$

$$|f_2/f_3| < 0.5; \quad (10)$$

$$3.0 < |f/f_4| + |f/f_5| < 5.0; \quad (11)$$

wherein, f is a focal length of the optical system for imaging pickup, $f_2$ is a focal length of the second lens element, $f_3$ is a focal length of the third lens element, $f_4$ is a focal length of the fourth lens element, $f_5$ is a focal length of the fifth lens element, $R_1$ is a curvature radius of the object-side surface of the first lens element, and $R_2$ is a curvature radius of the image-side surface of the first lens element.

Moreover, the present invention provides an optical system for imaging pickup, as described above, further comprising an image sensor at an image plane for imaging an imaged object, wherein the second lens element has negative refractive power; and the optical system for imaging pickup satisfies one or more of the following relations in addition to the relations (1), (2), (3) and (4):

$$TTL/\text{ImgH} < 2.1; \quad (12)$$

wherein TTL is the axial distance between the object-side surface of the first lens element and the image plane, and ImgH is half of the diagonal length of an effective photosensitive area of the image sensor.

It is another objective of the present invention to provide an optical system for imaging pickup, sequentially arranged from an object side to an image side along an optical axis, comprising: the first lens element, the second lens element, the third lens element, the fourth lens element and the fifth lens element; wherein the first lens element with positive refractive power has a convex image-side surface; the second lens element with refractive power has a concave image-side surface; the third lens element with refractive power; the fourth lens element with positive refractive power has a convex image-side surface, both object-side surface and image-side surface being aspheric, and at least one of the object-side surface and the image-side surface has at least one inflection point; the fifth lens element with negative refractive power has a concave image-side surface and both object-side surface and image-side surface being aspheric, and at least one of the object-side surface and the image-side surface has at least one inflection point, and the optical system for imaging pickup satisfies the following relations:

$$|R_1|/R_2 < -1.0; \quad (1)$$

$$0.5 < f_1/f < 1.4; \quad (2)$$

$$-1.5 < f_5/f < -0.3; \quad (3)$$

wherein $R_1$ is the curvature radius of the object-side surface of the first lens element, $R_2$ is the curvature radius of the image-side surface of the first lens element, f is the focal length of the optical system for imaging pickup, $f_1$ is the focal length of the first lens element, and $f_5$ is the focal length of the fifth lens element.

Moreover, the present invention provides an optical system for imaging pickup as described above, wherein the first lens element has a convex object-side surface; the second lens element has negative refractive power; the fourth lens element and the fifth lens element are made of plastic; and the optical system for imaging pickup satisfies one or more of the following relations in addition to the relations (1), (2) and (3):

$$-2.0 < R_2/R_4 < -0.3; \quad (7)$$

$$|R_1|/R_2 < -2.0; \quad (9)$$

$$3.0 < |f/f_4| + |f/f_5| < 5.0; \quad (11)$$

wherein, $R_1$ is the curvature radius of the object-side surface of the first lens element, $R_2$ is the curvature radius of the image-side surface of the first lens element, $R_4$ is the curvature radius of the image-side surface of the second lens element, f is the focal length of the optical system for imaging pickup, $f_4$ is the focal length of the fourth lens element, and $f_5$ is the focal length of the fifth lens element.

Another objective of the present invention is to provide an optical system for imaging pickup, sequentially arranged from an object side to an image side, comprising: the first lens element, the second lens element, the third lens element, the fourth lens element and the fifth lens element; wherein the first lens element with positive refractive power has a convex image-side surface; the second lens element has negative refractive power; the third lens element has refractive power; the fourth lens element with positive refractive power both object-side surface and image-side surface being aspheric, and at least one of the object-side surface and the image-side surface has at least one inflection point; the fifth lens element with negative refractive power has a concave image-side surface and both object-side surface and image-side surface being aspheric, and at least one of the object-side surface and the image-side surface has at least one inflection point, and the optical system for imaging pickup satisfies the following relations:

$$|R_1|/R_2 < -1.0; \quad (1)$$

$$0.5 < f_1/f < 1.4; \quad (2)$$

$$-1.5 < f_5/f < -0.3; \quad (3)$$

$$0.35 < f_4/f < 0.67; \quad (13)$$

wherein, $R_1$ is the curvature radius of the object-side surface of the first lens element, $R_2$ is the curvature radius of the image-side surface of the first lens element, f is the focal length of the optical system for imaging pickup, $f_1$ is the focal length of the first lens element, $f_4$ is the focal length of the fourth lens element, and $f_5$ is the focal length of the fifth lens element.

Moreover, the present invention provides an optical system for imaging pickup as described above, wherein the fourth lens element has a concave object-side surface and a convex image-side surface, and the optical system for imaging pickup satisfies one or more of the following relations in addition to the relations (1), (2), (3) and (4):

$$0.70 < S_D/T_D < 1.15; \quad (4)$$

$$|f_2/f_3| < 0.5; \quad (10)$$

$$-2.0 < R_2/R_4 < -0.3; \quad (7)$$

$$0.6 < \text{ImgH}/f < 1.0; \quad (6)$$

wherein, $S_D$ is the axial distance between the stop and the image-side surface of the fifth lens element, $T_D$ is the axial distance between the object-side surface of the first lens element and the image-side surface of the fifth lens element, f is the focal length of the optical system for imaging pickup, $f_2$ is the focal length of the second lens element, $f_3$ is the focal length of the third lens element, $R_2$ is the curvature radius of the image-side surface of the first lens element, $R_4$ is the curvature radius of the image-side surface of the second lens element, and ImgH is half of the diagonal length of an effective photosensitive area of the image sensor.

With the installation of the aforementioned first lens element, second lens element, third lens element, fourth lens element and fifth lens element with an appropriate interval apart from one another, the present invention can provide a good aberration correction and an advantageous modulation transfer function (MTF) in a greater field of view.

In the present invention of an optical system for imaging pickup comprising the first lens element, second lens element, third lens element, fourth lens element and fifth lens element, the first lens element with positive refractive power provides most of the refractive power required by the system, and the second lens element with negative refractive power can correct aberrations produced by the lens element with positive refractive power effectively and correct the Petzval sum of the system to make the image surface on the edge flatter. If the second lens element has a concave image-side surface, the negative refractive power of the second lens element can be enhanced appropriately according to the surface shape to provide a good aberration correction effect to the system. The third lens element corrects the aberration after the first lens element and the second lens element are assembled to improve the resolution of the optical system for imaging pickup, so that the overall aberration and distortion of the optical system for imaging pickup can meet the high resolution requirement. With the complementary fourth lens element with positive refractive power and fifth lens element with negative refractive power, the telephoto structure can facilitate reducing the back focal length, so as to shorten the total length. In addition, the fourth lens element having a convex image-side surface facilitates correcting the astigmatism and high-level aberration of the optical system for imaging pickup. The fifth lens element having a concave image-side surface can maintain the second principal point of the optical system for imaging pickup far from the image plane to facilitate reducing the total length of optical system for imaging pickup and achieve a compact system.

In the optical system for imaging pickup of the present invention, the arrangement of the stop produces a longer distance between the exit pupil of the optical system for imaging pickup and the image plane, so that the light of an image can be projected directly and then received by the image sensor to avoid dark corners or achieve the telecentric effect on the image side. In general, the telecentric effect can improve the brightness of the image plane and enhance the speed of receiving images by the CCD or CMOS image sensor.

In the optical system for imaging pickup of the present invention, the combination of the first lens element with positive refractive power, the second lens element with negative refractive power and the third lens element with refractive power, and the mutual compensation of the fourth lens element with refractive power and the fifth lens element with negative refractive power can reduce the total length of the optical system for imaging pickup effectively.

If the fifth lens element has an inflection point, the inflection point can be used for guiding light with an angle out from the edges of the fifth lens element, such that the light at the off-axis view angle is guided toward and received by the image sensor. In addition, the fourth lens element and the fifth lens element are made of plastic to facilitate the manufacture and lower the cost.

DETAILED DESCRIPTION OF THE PREFERRED EMBODIMENTS

Figure 1A:
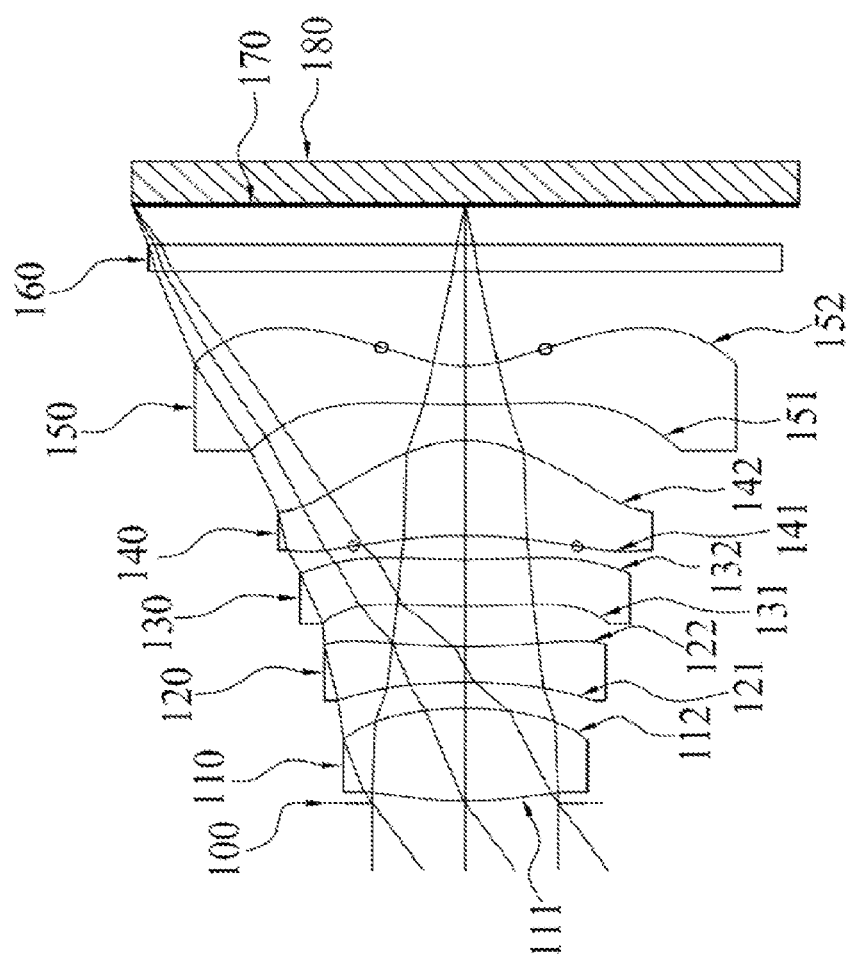
FIG. 1A is a schematic view of an optical system for imaging pickup in accordance with the first preferred embodiment of the present invention.

With reference to FIG. 1A, an optical system for imaging pickup of the present invention, sequentially arranged from an object side to an image side, comprising: the first lens element 110, the second lens element 120, the third lens element 130, the fourth lens element 140 and the fifth lens element 150, wherein the first lens element 110 with positive refractive power has a convex image-side surface 112; the second lens element 120 with refractive power has a concave image-side surface 122; the third lens element 130 has refractive power; the fourth lens element 140 with refractive power has both object-side surface 141 and image-side surface 142 being aspheric, and at least one of the object-side surface 141 and image-side surface 142 has at least one inflection point (see small circles in FIG. 1A); and the fifth lens element 150 with negative refractive power has a concave image-side surface 152 and both object-side surface 151 and image-side surface 152 being aspheric, and at least one of the object-side surface and the image-side surface has at least one inflection point (see small circles in FIG. 1A). The optical system for imaging pickup further comprises a stop and an IR-filter 160. More specifically, the stop can be an aperture stop 100 wherein it is a front aperture stop between an photographed object and the first lens element 110, and the IR-filter 160 is between the fifth lens element 150 and an image plane 170 and generally made of panel glass without affecting the focal length of the optical system for imaging pickup of the present invention. The optical system for imaging pickup further comprises an image sensor 180 on the image plane 170 for imaging an object to be imaged. The aspheric surfaces of the first lens element 110, second lens element 120, third lens element 130, fourth lens element 140, and fifth lens element 150 comply with the aspherical surface formula as given in Equation (14).

$$X(Y) = \frac{(Y^2/R)}{1+\sqrt{(1-(1+K)(Y/R)^2)}} + \sum_i (A_i) \cdot (Y^i) \quad (14)$$

Wherein,

X is the relative height between a point on the aspherical surface with a distance Y away from the optical axis and a tangent plane at the tip of the optical axis of the aspherical surface;

Y is the distance between a point on the curvature of the aspherical surface and the optical axis;

R is the curvature radius near the optical axis;

K is the conic coefficient; and $A_i$ is the $i^{th}$ level aspherical surface coefficient.

In the optical system for imaging pickup of the present invention, the first lens element 110, second lens element 120 and third lens element 130 can have spherical or aspheric surfaces. If aspheric optical surfaces are adopted, then the curvature radius of the optical surface can be used for changing the refractive power to reduce or eliminate aberrations, so as to shorten the total length of the optical imaging lens assembly effectively. With the installation of the first lens element 110, second lens element 120, third lens element 130, fourth lens element 140 and fifth lens element 150, the optical system for imaging pickup satisfies the relation (1) (2) and (3).

In the optical system for imaging pickup of the present invention, the positive refractive power is mainly provided by the first lens element 110, such that if the ratio of the curvature radius $R_1$ of the object-side surface 111 of the first lens element 110 to the curvature radius $R_2$ of the image-side surface 112 of the first lens element 110 is limited according to the relation (1), the adjustment of the surface shape of the object-side surface 111 and the image-side surface 112 of the first lens element 110 can assist correcting the aberration of the system and facilitating allocating the positive refractive power of the first lens element 110. If the relations (2) and (3) are satisfied, the design with the focal length $f_1$ of the first lens element 110 and the focal length $f_5$ of the fifth lens element 150 can be balanced within the range of specific conditions to facilitate allocating the refractive power of the first lens element 110 and the fifth lens element 150 appropriately to provide a suitable refractive power required by the optical system for imaging pickup and correct aberrations produced by the system, so as to adjust the back focal length and the total length appropriately.

If the relation (4) is satisfied, the position of the aperture stop relative to the distance between the first lens element 110 and the fifth lens element 150 can be adjusted to reduce the length of the optical system for imaging pickup. Similarly, if the relation (6) or (12) is satisfied, the total length of the optical system for imaging pickup can be reduced effectively, so that the image sensor 180 can have a larger effective pixel range within the same total length or specific focal length, so as to facilitate adjusting the view angle of the optical system for imaging pickup within an appropriate range.

If the relation (5), (8) or (11) is satisfied, the focal length $f_2$ of the second lens element 120, the focal length $f_3$ of the third lens element 130, the focal length $f_4$ of the fourth lens element 140 and the focal length $f_5$ of the fifth lens element 150 can be balanced in a limited condition to appropriately allocate the refractive power required by the optical system for imaging pickup and reduce the sensitivity and aberration of the optical system for imaging pickup.

In the optical system for imaging pickup of the present invention, the first lens element 110 has a convex image-side surface 112, and the second lens element 120 has a concave image-side surface 122. If ratio of the curvature radii of the image-side surface 112 of the first lens element 110 and the image-side surface 122 of the second lens element 120 is limited according to the relation (7), the refractive power of the second lens element 120 and the positive refractive power of the first lens element 110 can be adjusted to complement each other, and the refractive power can be adjusted according to the curvature of the surface shape to facilitate correcting the aberration of the system.

The optical system for imaging pickup of the present invention is described by means of preferred embodiments with relevant drawings as follows.

First Preferred Embodiment

Figure 1B:
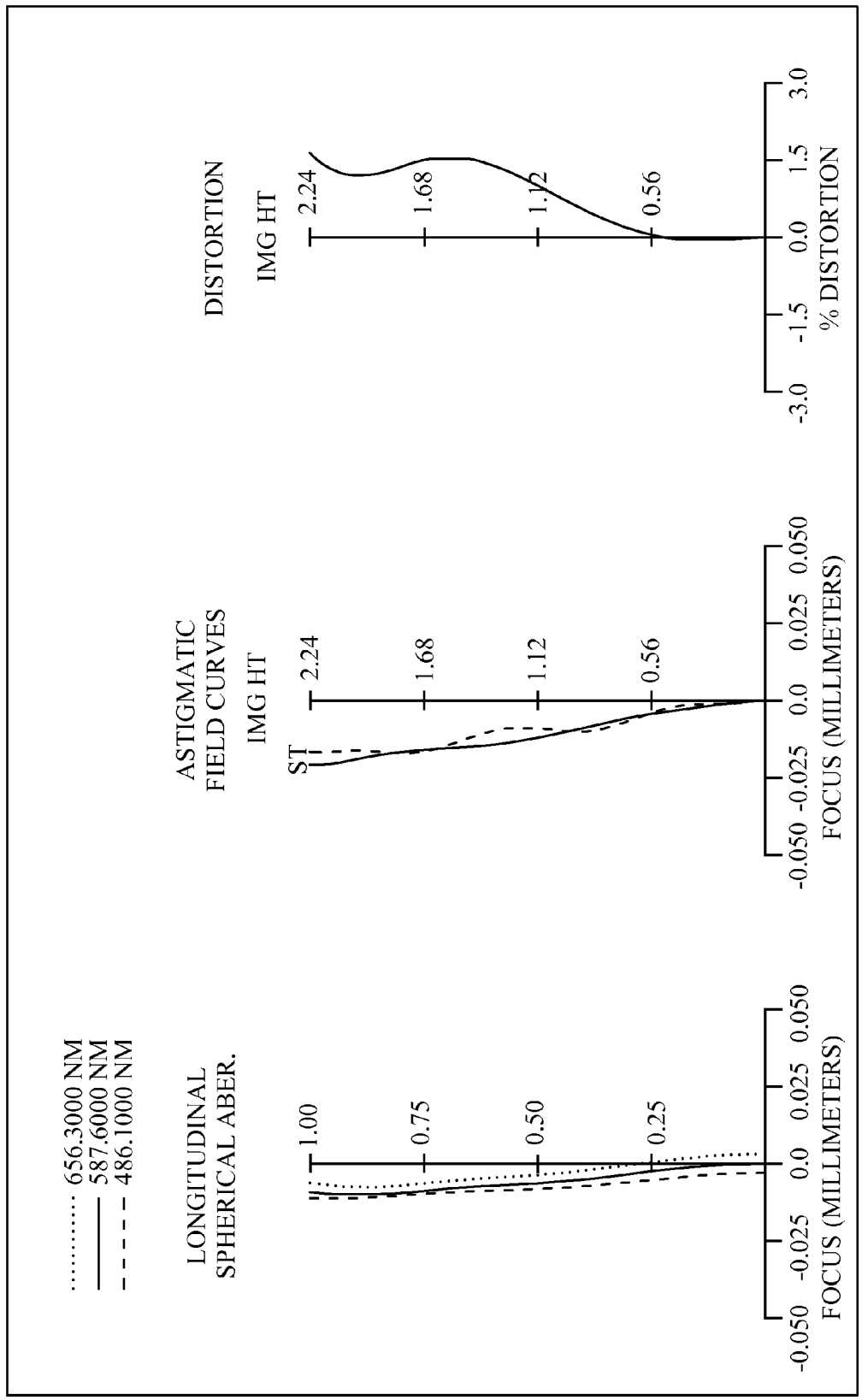
FIG. 1B is a schematic view of a series of aberration curves of the first preferred embodiment of the present invention.

With reference to FIGS. 1A and 1B for a schematic view and a series of aberration curves of an optical system for imaging pickup in accordance with the first preferred embodiment of the present invention respectively, the optical system for imaging pickup, sequentially arranged from an object side to an image side along an optical axis, comprises: a stop, which can be an aperture stop 100; the plastic first lens element 110 with positive refractive power having a convex object-side surface 111 and a convex image-side surface 112 and both object-side surface 111 and image-side surface 112 being aspheric; the plastic second lens element 120 with negative refractive power having a concave object-side surface 121 and a concave image-side surface 122, and both object-side surface 121 and image-side surface 122 being aspheric; the plastic third lens element 130 with positive refractive power having a convex object-side surface 131 and a concave image-side surface 132, and both object-side surface 131 and image-side surface 132 being aspheric; the plastic fourth lens element 140 with positive refractive power having a concave object-side surface 141 and a convex image-side surface 142, and both object-side surface 141 and image-side surface 142 being aspheric; the plastic fifth lens element 150 with negative refractive power having a convex object-side surface 151 and a concave image-side surface 152, and both object-side surface 151 and image-side surface 152 being aspheric, and both of the object-side surface 151 and image-side surface 152 having at least one inflection point; an IR-filter 160, made of panel glass, without affecting the focal length of the optical lens assembly for image taking; and an image sensor 180 at an image plane 170.

TABLE 1

Optical data of the first preferred embodiment
f = 3.24 mm, Fno = 2.60, HFOV = 34.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.016 | | | | |

TABLE 1-continued

Optical data of the first preferred embodiment
f = 3.24 mm, Fno = 2.60, HFOV = 34.2 deg.

| Surface # | | Curvature Radius | Thickness | Material | Index | Abbe # | Focal length |
|---|---|---|---|---|---|---|---|
| 2 | | 2.514710 (ASP) | 0.683 | | | | |
| | Lens 1 | | | Plastic | 1.544 | 55.9 | 2.28 |
| 3 | | −2.217170 (ASP) | 0.190 | | | | |
| 4 | | −3.645200 (ASP) | 0.265 | | | | |
| | Lens 2 | | | Plastic | 1.634 | 23.8 | −2.94 |
| 5 | | 3.923000 (ASP) | 0.297 | | | | |
| 6 | | 4.465700 (ASP) | 0.345 | | | | |
| | Lens 3 | | | Plastic | 1.634 | 23.8 | 29.07 |
| 7 | | 5.716900 (ASP) | 0.175 | | | | |
| 8 | | −3.083000 (ASP) | 0.699 | | | | |
| | Lens 4 | | | Plastic | 1.544 | 55.9 | 1.61 |
| 9 | | −0.737740 (ASP) | 0.264 | | | | |
| 10 | | 6.676400 (ASP) | 0.281 | | | | |
| | Lens 5 | | | Plastic | 1.530 | 55.8 | −1.59 |
| 11 | | 0.737020 (ASP) | 0.700 | | | | |
| 12 | | Plano | 0.200 | | | | |
| | IR-filter | | | Glass | 1.517 | 64.2 | — |
| 13 | | Plano | 0.292 | | | | |
| 14 | Image | Plano | — | | | | |

Note:
Reference wavelength is 587.6 nm. ASP stands for aspherical surfaces.

The optical data of this preferred embodiment are listed in Table 1, wherein the object-side surfaces and the image-side surfaces of the first lens element 110 to the fifth lens element 150 comply with the aspherical surface formula as given in Equation (14), and their aspheric coefficients are listed in Table 2 as follows:

TABLE 2

Aspheric coefficients of the first preferred embodiment

| Surface # | 2 | 3 | 4 | 5 | 6 |
|---|---|---|---|---|---|
| k = | −2.11293E+01 | −2.55895E+00 | 2.93109E+00 | −1.71103E+01 | −1.52917E+01 |
| A4 = | 9.64131E−02 | −1.08522E−01 | −3.10754E−02 | −4.00458E−02 | −1.86538E−01 |
| A6 = | −3.17417E−01 | −1.04851E−01 | −1.67141E−01 | −6.14357E−02 | −9.86904E−02 |
| A8 = | 3.19932E−01 | −4.33036E−02 | 4.06091E−01 | 1.38123E−01 | 2.24541E−01 |
| A10 = | −5.10215E−01 | 1.50080E−01 | −6.98120E−01 | −3.62984E−01 | −3.25525E−01 |
| A12 = | 1.51467E−01 | −1.51650E−01 | 9.50323E−01 | 3.81199E−01 | 1.20168E−01 |
| A14 = | −2.44535E−02 | −4.38450E−03 | −5.18587E−01 | −1.74955E−01 | |

| Surface # | 7 | 8 | 9 | 10 | 11 |
|---|---|---|---|---|---|
| k = | −1.69619E+01 | 4.33083E+00 | −3.44481E+00 | −1.00000E+00 | −5.04301E+00 |
| A4 = | −1.27294E−01 | 6.46183E−02 | −1.24756E−01 | −1.08846E−01 | −1.06817E−01 |
| A6 = | −8.14955E−02 | 6.42169E−02 | 1.51132E−01 | −2.60669E−02 | 3.56917E−02 |
| A8 = | 1.18636E−01 | −2.16923E−01 | −1.13255E−01 | 2.34237E−02 | −1.22588E−02 |
| A10 = | −9.00897E−02 | 3.05034E−01 | 6.82200E−02 | −6.78874E−03 | 2.16080E−03 |
| A12 = | 3.86290E−02 | −1.71392E−01 | −1.65507E−02 | −1.34988E−03 | −2.02645E−04 |
| A14 = | | 3.64181E−02 | 1.72306E−03 | 8.81944E−04 | 8.11767E−06 |

With reference to Table 1 and FIG. 1B for an optical system for imaging pickup of this preferred embodiment, the optical system for imaging pickup has a focal length f=3.24 (mm), an f-number Fno=2.60, and a half of maximum view angle HFOV=34.2°. After the optical data of this preferred embodiment are calculated and derived, the optical system for imaging pickup satisfies related conditions as shown in Table 3 below, and the related symbols have been described above and thus will not be described again.

TABLE 3

Data of related of the first preferred embodiment

| Relation | Data |
|---|---|
| $|R_1|/R_2$ | −1.13 |
| $R_2/R_4$ | −0.57 |
| $f_1/f$ | 0.70 |
| $|f_2/f_3|$ | 0.10 |

TABLE 3-continued

Data of related of the first preferred embodiment

| Relation | Data |
| --- | --- |
| $f_4/f$ | 0.50 |
| $f_5/f$ | −0.49 |
| $|f/f_4| + |f/f_5|$ | 4.05 |
| $S_D/T_D$ | 1.01 |
| ImgH/f | 0.69 |
| TTL/ImgH | 1.93 |

According to the optical data as shown in Table 1 and the series of aberration curves as shown in FIG. 1B, the optical system for imaging pickup in accordance with this preferred embodiment of the present invention provides good correction results in aspects of the longitudinal spherical aberration, astigmatic field curving, and distortion.

Second Preferred Embodiment

Figure 2A:
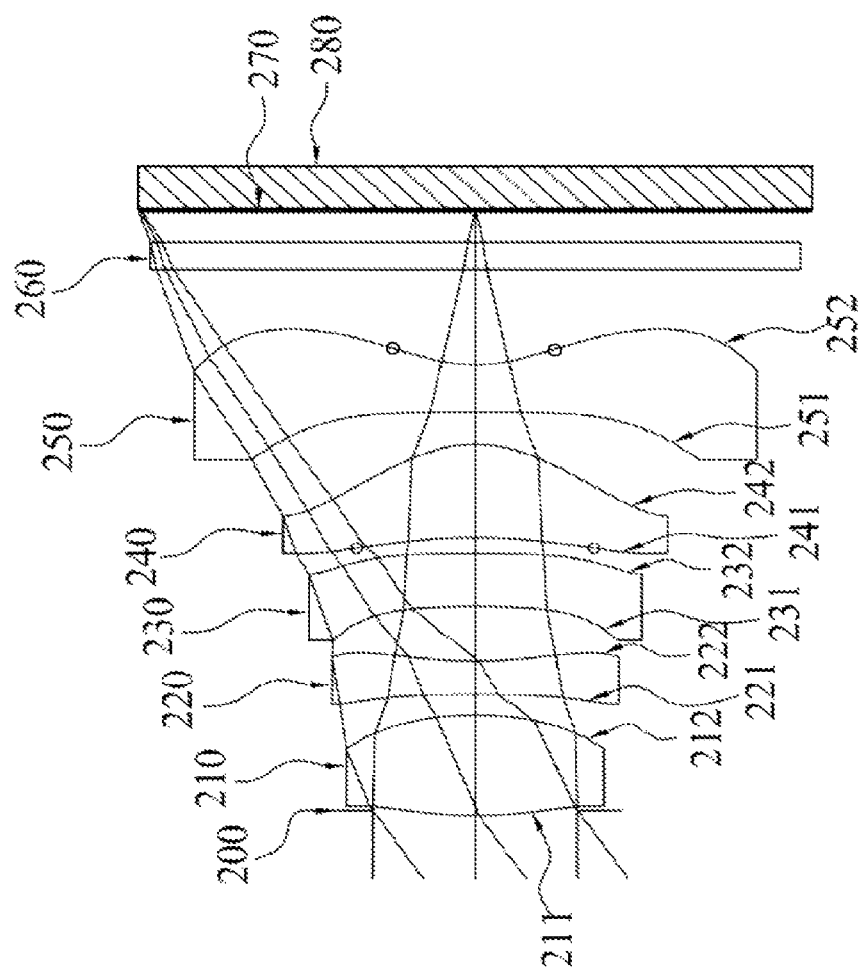
FIG. 2A is a schematic view of an optical system for imaging pickup in accordance with the second preferred embodiment of the present invention.
Figure 2B:
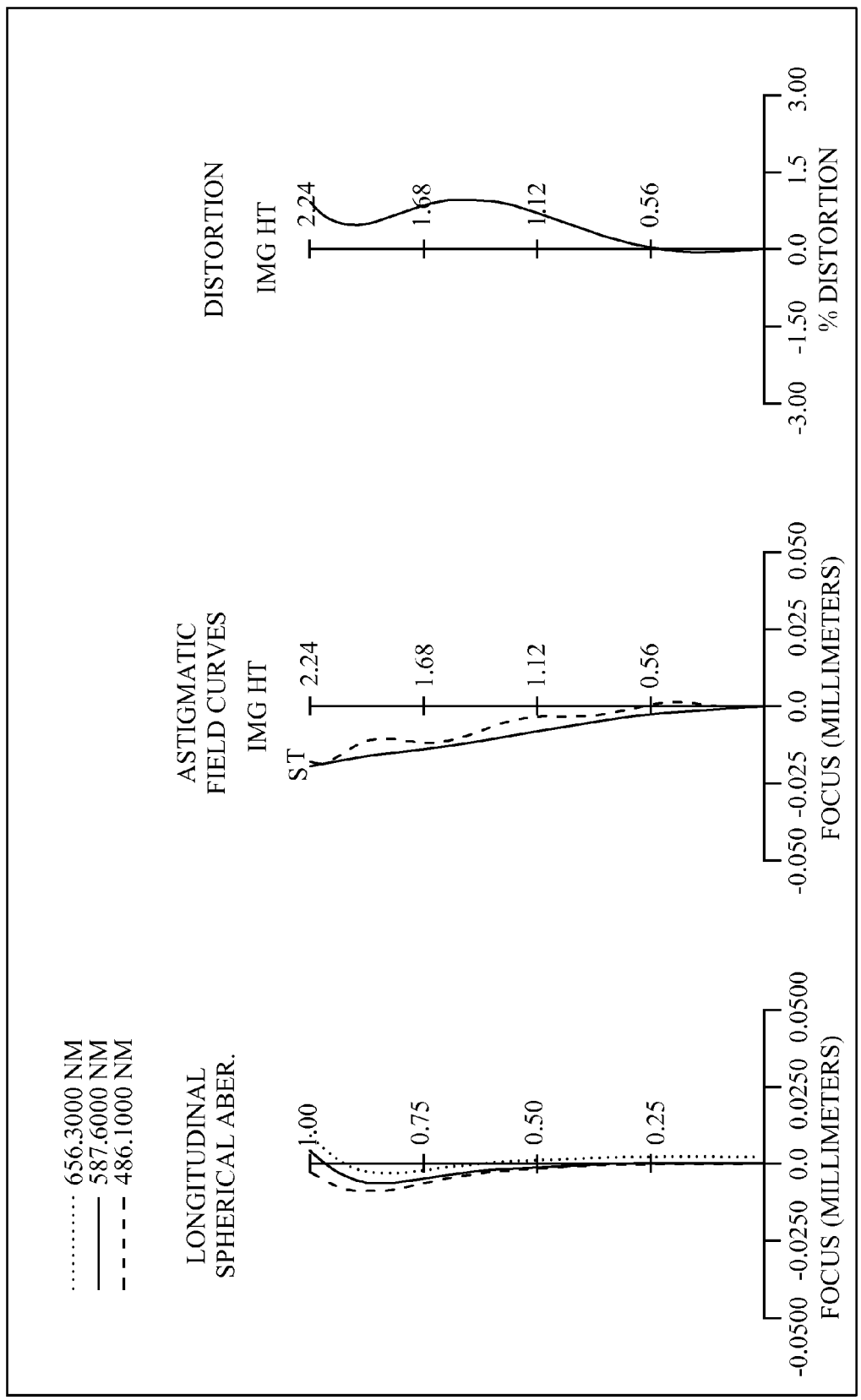
FIG. 2B is a schematic view of a series of aberration curves of the second preferred embodiment of the present invention.

With reference to FIGS. 2A and 2B for a schematic view and a series of aberration curves of an optical system for imaging pickup in accordance with the second preferred embodiment of the present invention respectively, the optical system for imaging pickup, sequentially arranged from an object side to an image side along an optical axis, comprises: a stop, which can be an aperture stop 200; the plastic first lens element 210 with positive refractive power having a convex object-side surface 211 and a convex image-side surface 212 and both object-side surface 211 and image-side surface 212 being aspheric; the plastic second lens element 220 with negative refractive power having a concave object-side surface 221 and a concave image-side surface 222, and both object-side surface 221 and image-side surface 222 being aspheric; the plastic third lens element 230 with negative refractive power having a concave object-side surface 231 and a convex image-side surface 232, and both object-side surface 231 and image-side surface 232 being aspheric; the plastic fourth lens element 240 with positive refractive power having a concave object-side surface 241 and a convex image-side surface 242, and both object-side surface 241 and image-side surface 242 being aspheric, and at least one of the object-side surface 241 and image-side surface 242 has at least one inflection point (see small circles in FIG. 2A); the plastic fifth lens element 250 with negative refractive power having a concave object-side surface 251 and a concave image-side surface 252, and both object-side surface 251 and image-side surface 252 being aspheric, and the image-side surface 252 having at least one inflection point (see small circles in FIG. 2A); an IR-filter 260, made of panel glass, without affecting the focal length of the optical lens assembly for image taking; and an image sensor 280 at an image plane 270.

TABLE 4

Optical data of the second preferred embodiment
f = 3.29 mm, Fno = 2.40, HFOV = 34.1 deg.

| Surface # | | Curvature Radius | Thickness | Material | Index | Abbe # | Focal length |
| --- | --- | --- | --- | --- | --- | --- | --- |
| 0 | Object | Plano | Infinity | | | | |
| 1 | Ape. Stop | Plano | −0.036 | | | | |
| 2 | | 2.604970 (ASP) | 0.735 | | | | |
| | Lens 1 | | | Plastic | 1.544 | 55.9 | 2.19 |
| 3 | | −1.983380 (ASP) | 0.150 | | | | |
| 4 | | −12.097300 (ASP) | 0.245 | | | | |
| | Lens 2 | | | Plastic | 1.634 | 23.8 | −3.46 |
| 5 | | 2.697840 (ASP) | 0.397 | | | | |
| 6 | | −9.518300 (ASP) | 0.389 | | | | |
| | Lens 3 | | | Plastic | 1.634 | 23.8 | −22.55 |
| 7 | | −28.935200 (ASP) | 0.119 | | | | |
| 8 | | −3.556100 (ASP) | 0.685 | | | | |
| | Lens 4 | | | Plastic | 1.544 | 55.9 | 1.59 |
| 9 | | −0.743070 (ASP) | 0.231 | | | | |
| 10 | | −61.614300 (ASP) | 0.347 | | | | |
| | Lens 5 | | | Plastic | 1.530 | 55.8 | −1.53 |
| 11 | | 0.820630 (ASP) | 0.700 | | | | |
| 12 | | Plano | 0.200 | | | | |
| | IR-filter | | | Glass | 1.517 | 64.2 | — |
| 13 | | Plano | 0.237 | | | | |
| 14 | Image | Plano | — | | | | |

Note:
Reference wavelength is 587.6 nm. ASP stands for aspherical surfaces.

The optical data of this preferred embodiment are listed in Table 4, wherein the object-side surfaces and the image-side surfaces of the first lens element 210 to the fifth lens element 250 comply with the aspherical surface formula as given in Equation (14), and their aspheric coefficients are listed in Table 5 as follows:

TABLE 5

Aspheric coefficients of the second preferred embodiment

| Surface # | 2 | 3 | 4 | 5 | 6 |
| --- | --- | --- | --- | --- | --- |
| k = | −2.51219E+01 | −6.18551E+00 | 3.00000E+00 | −1.13175E+01 | 3.00000E+00 |
| A4 = | 1.03528E−01 | −1.21947E−01 | −6.42311E−02 | −6.06786E−02 | −1.84648E−01 |
| A6 = | −3.21309E−01 | −1.02647E−01 | −1.30442E−01 | −6.52542E−02 | −1.31409E−01 |

TABLE 5-continued

Aspheric coefficients of the second preferred embodiment

| A8 = | 2.89546E−01 | 5.89428E−02 | 4.23469E−01 | 1.53736E−01 | 2.75344E−01 |
| A10 = | −3.28673E−01 | 1.71423E−02 | −7.21205E−01 | −3.94231E−01 | −3.66226E−01 |
| A12 = | 4.67871E−02 | −8.08678E−02 | 8.26780E−01 | 3.72224E−01 | 1.69011E−01 |
| A14 = | −2.44535E−02 | 9.99005E−03 | −3.88300E−01 | −1.46766E−01 | −1.33020E−11 |

| Surface # | 7 | 8 | 9 | 10 | 11 |
| --- | --- | --- | --- | --- | --- |
| k = | −1.00000E+00 | 6.08615E+00 | −3.36558E+00 | −1.00000E+00 | −5.91779E+00 |
| A4 = | −1.11992E−01 | 3.79604E−02 | −1.23868E−01 | −3.87886E−02 | −9.36696E−02 |
| A6 = | −9.37303E−02 | 7.41536E−02 | 1.71181E−01 | −6.03147E−02 | 3.14019E−02 |
| A8 = | 1.25484E−01 | −2.14415E−01 | −1.21236E−01 | 3.95880E−02 | −1.09469E−02 |
| A10 = | −6.61474E−02 | 2.99317E−01 | 6.68802E−02 | −6.72586E−03 | 2.18529E−03 |
| A12 = | 4.57060E−02 | −1.73542E−01 | −1.67334E−02 | −2.18669E−03 | −2.87776E−04 |
| A14 = | −9.90717E−03 | 3.74546E−02 | 1.06166E−03 | 7.09323E−04 | 1.54590E−05 |

With reference to Table 4 and FIG. 2B for an optical system for imaging pickup of this preferred embodiment, the optical system for imaging pickup has a focal length f=3.29 (mm), an f-number Fno=2.40, and a half of maximum view angle HFOV=34.1°. After the optical data of this preferred embodiment are calculated and derived, the optical system for imaging pickup satisfies related conditions as shown in Table 6 below, and the related symbols have been described above and thus will not be described again.

TABLE 6

Data of related of the second preferred embodiment

| Relation | Data |
| --- | --- |
| $\|R_1\|/R_2$ | −1.31 |
| $R_2/R_4$ | −0.74 |
| $f_1/f$ | 0.67 |
| $\|f_2/f_3\|$ | 0.15 |
| $f_4/f$ | 0.48 |
| $f_5/f$ | −0.46 |
| $\|f/f_4\| + \|f/f_5\|$ | 4.22 |
| $S_D/T_D$ | 0.99 |
| ImgH/f | 0.68 |
| TTL/ImgH | 1.95 |

According to the optical data as shown in Table 4 and the series of aberration curves as shown in FIG. 2B, the optical system for imaging pickup in accordance with this preferred embodiment of the present invention provides good correction results in aspects of the longitudinal spherical aberration, astigmatic field curving, and distortion.

Third Preferred Embodiment

Figure 3A:
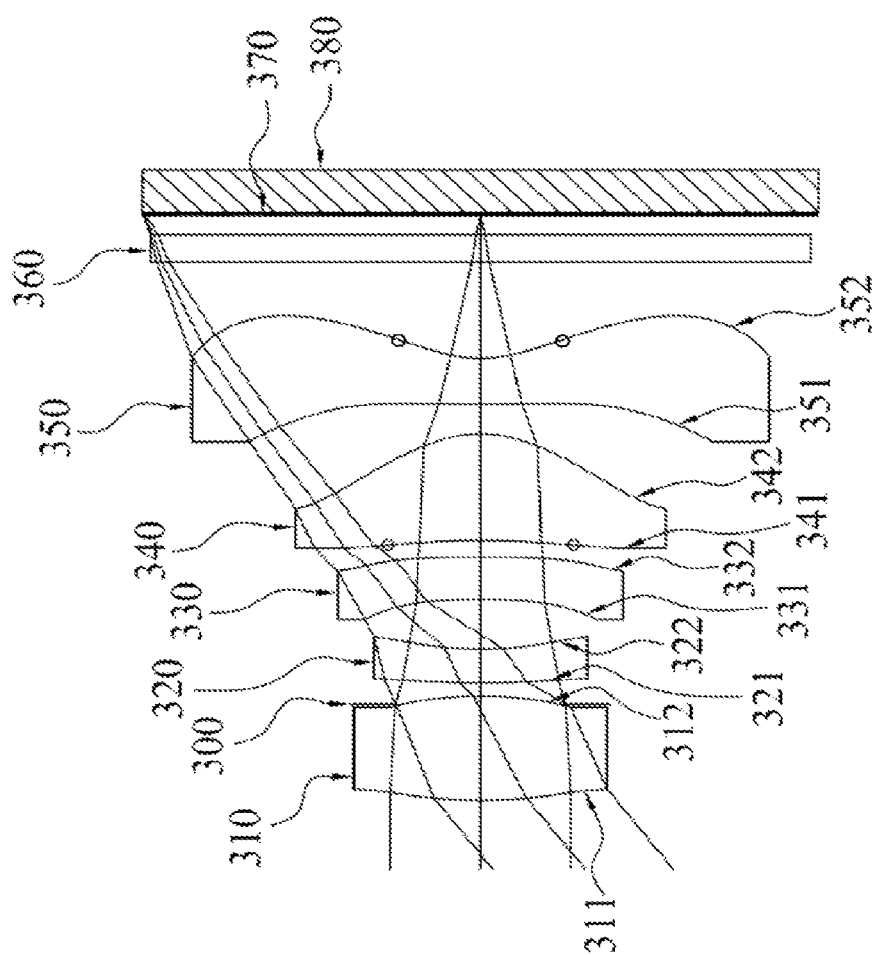
FIG. 3A is a schematic view of an optical system for imaging pickup in accordance with the third preferred embodiment of the present invention.
Figure 3B:
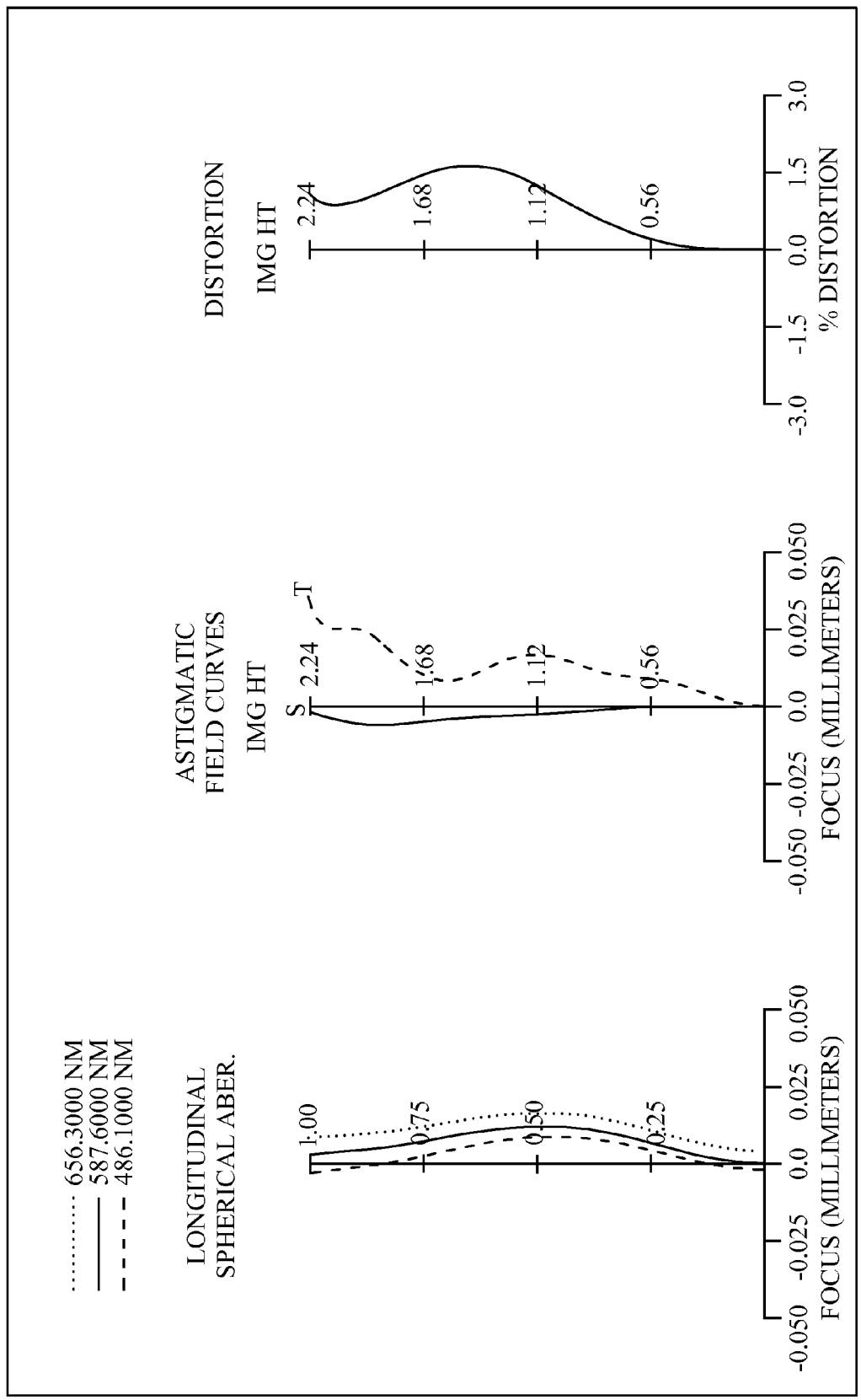
FIG. 3B is a schematic view of a series of aberration curves of the third preferred embodiment of the present invention.

With reference to FIGS. 3A and 3B for a schematic view and a series of aberration curves of an optical system for imaging pickup in accordance with the third preferred embodiment of the present invention respectively, the optical system for imaging pickup, sequentially arranged from an object side to an image side along an optical axis, comprises: the plastic first lens element 310 with positive refractive power having a convex object-side surface 311 and a convex image-side surface 312 and both object-side surface 311 and image-side surface 312 being aspheric; a stop, which can be an aperture stop 300; the plastic second lens element 320 with negative refractive power having a convex object-side surface 321 and a concave image-side surface 322, and both object-side surface 321 and image-side surface 322 being aspheric; the plastic third lens element 330 with negative refractive power having a concave object-side surface 331 and a convex image-side surface 332, and both object-side surface 331 and image-side surface 332 being aspheric; the plastic fourth lens element 340 with positive refractive power having a concave object-side surface 341 and a convex image-side surface 342, and both object-side surface 341 and image-side surface 342 being aspheric, and at least one of the object-side surface 341 and image-side surface 342 has at least one inflection point (see small circles in FIG. 3A); the plastic fifth lens element 350 with negative refractive power having a convex object-side surface 351 and a concave image-side surface 352, and both object-side surface 351 and image-side surface 352 being aspheric, and both of the object-side surface 351 and image-side surface 352 having at least one inflection point (see small circles in FIG. 3A); an IR-filter 360, made of panel glass, without affecting the focal length of the optical lens assembly for image taking; and an image sensor 380 at an image plane 370.

TABLE 7

Optical data of the third preferred embodiment
f = 2.93 mm, Fno = 2.45, HFOV = 37.0 deg.

| Surface # | | Curvature Radius | Thickness | Material | Index | Abbe # | Focal length |
| --- | --- | --- | --- | --- | --- | --- | --- |
| 0 | Object | Plano | Infinity | | | | |
| 1 | | 2.723040 (ASP) | 0.759 | | | | |
| | Lens 1 | | | Plastic | 1.544 | 55.9 | 2.42 |
| 2 | | −2.307660 (ASP) | −0.057 | | | | |
| 3 | Ape. Stop | Plano | 0.153 | | | | |
| 4 | | 5.432500 (ASP) | 0.245 | | | | |
| | Lens 2 | | | Plastic | 1.650 | 21.4 | −4.84 |
| 5 | | 1.956380 (ASP) | 0.361 | | | | |
| 6 | | −5.317500 (ASP) | 0.307 | | | | |
| | Lens 3 | | | Plastic | 1.634 | 23.8 | −10.81 |
| 7 | | −24.271800 (ASP) | 0.122 | | | | |

TABLE 7-continued

Optical data of the third preferred embodiment
f = 2.93 mm, Fno = 2.45, HFOV = 37.0 deg.

| Surface # | | Curvature Radius | | Thickness | Material | Index | Abbe # | Focal length |
|---|---|---|---|---|---|---|---|---|
| 8 | | −4.626000 | (ASP) | 0.773 | | | | |
| | Lens 4 | | | | Plastic | 1.544 | 55.9 | 1.43 |
| 9 | | −0.704200 | (ASP) | 0.214 | | | | |
| 10 | | 11.216100 | (ASP) | 0.332 | | | | |
| | Lens 5 | | | | Plastic | 1.530 | 55.8 | −1.48 |
| 11 | | 0.725100 | (ASP) | 0.700 | | | | |
| 12 | | Plano | | 0.200 | | | | |
| | IR-filter | | | | Glass | 1.517 | 64.2 | — |
| 13 | | Plano | | 0.154 | | | | |
| 14 | Image | Plano | | — | | | | |

Note:
Reference wavelength is 587.6 nm. ASP stands for aspherical surfaces.

The optical data of this preferred embodiment are listed in Table 7, wherein the object-side surfaces and the image-side surfaces of the first lens element 310 to the fifth lens element 350 comply with the aspherical surface formula as given in Equation (14), and their aspheric coefficients are listed in Table 8 as follows:

TABLE 8

Aspheric coefficients of the third preferred embodiment

| Surface # | 1 | 2 | 4 | 5 | 6 |
|---|---|---|---|---|---|
| k = | −3.16677E+01 | −1.44139E+01 | −5.22091E+00 | −7.75072E+00 | −1.00000E+00 |
| A4 = | 1.24548E−01 | −8.33728E−02 | −6.61497E−03 | −2.73383E−02 | −2.69390E−01 |
| A6 = | −2.83818E−01 | −1.39288E−01 | −1.32288E−01 | −5.16571E−02 | −1.37821E−01 |
| A8 = | 2.40834E−01 | 1.32753E−01 | 8.99122E−02 | −7.20615E−03 | 3.97675E−01 |
| A10 = | −1.88144E−01 | 6.48137E−03 | −3.10314E−01 | −2.67737E−01 | −3.01206E−01 |
| A12 = | 4.86402E−02 | −8.08674E−02 | 8.27201E−01 | 3.71524E−01 | 1.69579E−01 |
| A14 = | −2.53314E−02 | 9.99028E−03 | −3.88300E−01 | −1.46766E−01 | −7.70694E−05 |

| Surface # | 7 | 8 | 9 | 10 | 11 |
|---|---|---|---|---|---|
| k = | −1.00000E+00 | 7.83609E+00 | −3.37338E+00 | −1.00000E+00 | −5.14236E+00 |
| A4 = | −1.48112E−01 | 5.89445E−02 | −1.52098E−01 | −7.41607E−02 | −9.32363E−02 |
| A6 = | −7.50650E−02 | 6.30700E−02 | 1.78676E−01 | −5.00992E−02 | 3.20367E−02 |
| A8 = | 1.53121E−01 | −2.20740E−01 | −1.15286E−01 | 4.27537E−02 | −1.14222E−02 |
| A10 = | −4.98822E−02 | 2.99179E−01 | 6.81369E−02 | −6.38496E−03 | 2.55215E−03 |
| A12 = | 5.17079E−02 | −1.73208E−01 | −1.71032E−02 | −2.34084E−03 | −3.45562E−04 |
| A14 = | −8.50233E−03 | 3.72027E−02 | 3.76144E−04 | 5.86079E−04 | 1.29060E−05 |

With reference to Table 7 and FIG. 3B for an optical system for imaging pickup of this preferred embodiment, the optical system for imaging pickup has a focal length f=2.93 (mm), an f-number Fno=2.45, and a half of maximum view angle HFOV=37.0°. After the optical data of this preferred embodiment are calculated and derived, the optical system for imaging pickup satisfies related conditions as shown in Table 9 below, and the related symbols have been described above and thus will not be described again.

TABLE 9

Data of related relations of the third preferred embodiment

| Relation | Data |
|---|---|
| $|R_1|/R_2$ | −1.18 |
| $R_2/R_4$ | −1.18 |
| $f_1/f$ | 0.83 |
| $|f_2/f_3|$ | 0.45 |
| $f_4/f$ | 0.49 |
| $f_5/f$ | −0.50 |
| $|f/f_4| + |f/f_5|$ | 4.04 |

TABLE 9-continued

Data of related relations of the third preferred embodiment

| Relation | Data |
|---|---|
| $S_D/T_D$ | 0.78 |
| ImgH/f | 0.76 |
| TTL/ImgH | 1.87 |

According to the optical data as shown in Table 7 and the series of aberration curves as shown in FIG. 3B, the optical system for imaging pickup in accordance with this preferred embodiment of the present invention provides good correction results in aspects of the longitudinal spherical aberration, astigmatic field curving, and distortion.

Fourth Preferred Embodiment

Figure 4A:
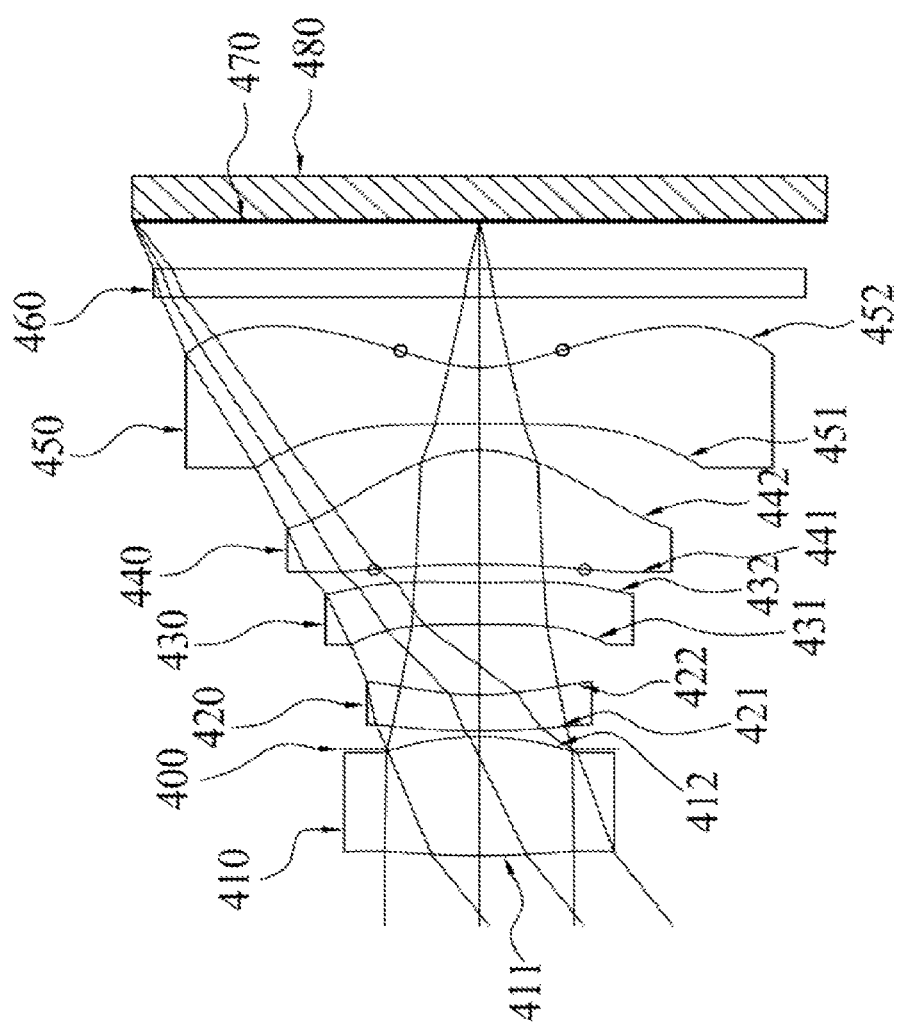
FIG. 4A is a schematic view of an optical system for imaging pickup in accordance with the fourth preferred embodiment of the present invention.
Figure 4B:
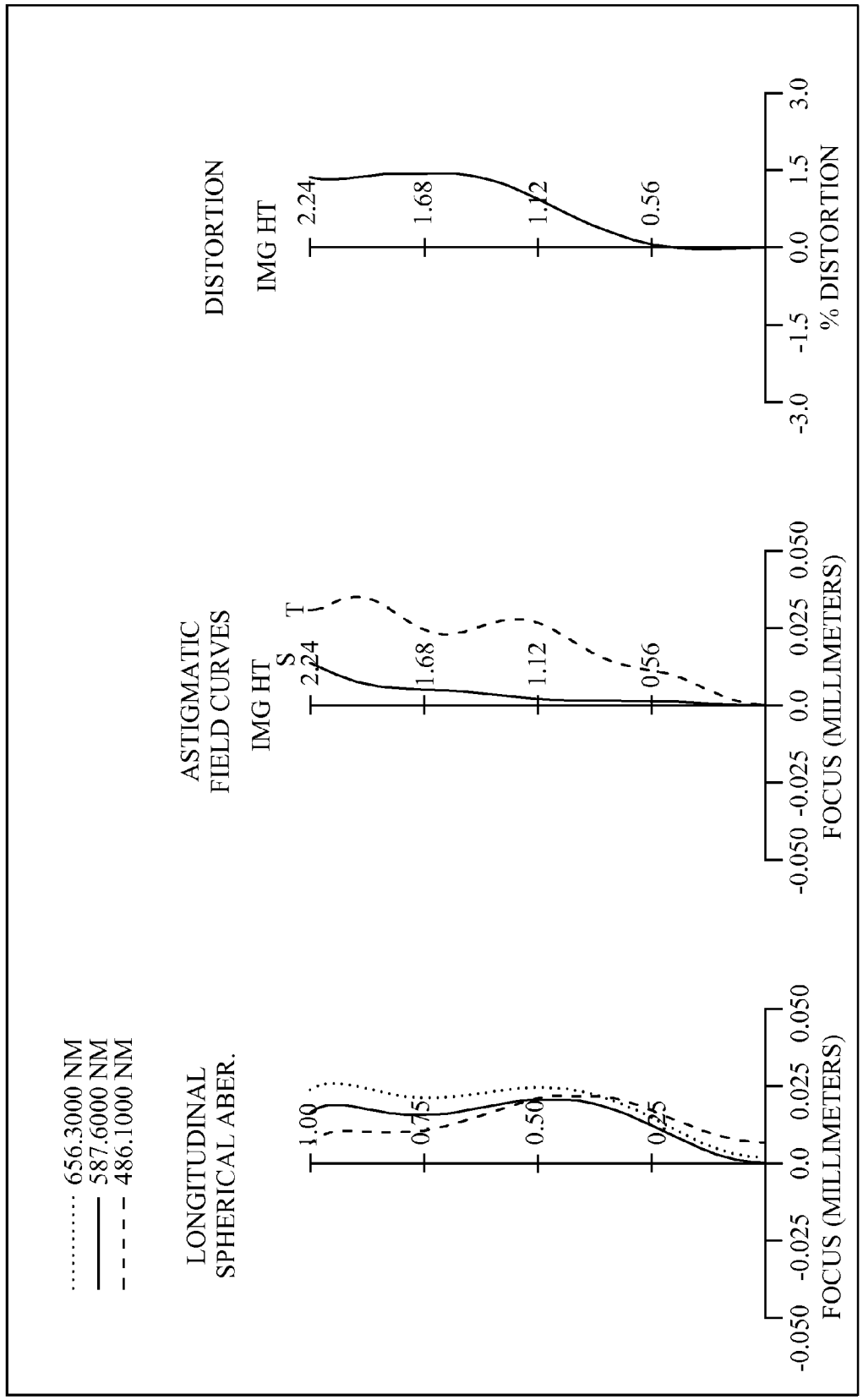
FIG. 4B is a schematic view of a series of aberration curves of the fourth preferred embodiment of the present invention.

With reference to FIGS. 4A and 4B for a schematic view and a series of aberration curves of an optical system for imaging pickup in accordance with the fourth preferred embodiment of the present invention respectively, the optical system for imaging pickup, sequentially arranged from an object side to an image side along an optical axis, comprises: the plastic first lens element 410 with positive refractive power having a convex object-side surface 411 and a convex image-side surface 412 and both object-side surface 411 and image-side surface 412 being aspheric; a stop, which can be an aperture stop 400; the plastic second lens element 420 with negative refractive power having a convex object-side surface 421 and a concave image-side surface 422, and both object-side surface 421 and image-side surface 422 being aspheric; the plastic third lens element 430 with negative refractive power having a concave object-side surface 431 and a concave image-side surface 432, and both object-side surface 431 and image-side surface 432 being aspheric; the plastic fourth lens element 440 with positive refractive power having a concave object-side surface 441 and a convex image-side surface 442, and both object-side surface 441 and image-side surface 442 being aspheric, and at least one of the object-side surface 441 and image-side surface 442 has at least one inflection point (see small circles in FIG. 4A); the plastic fifth lens element 450 with negative refractive power having a concave object-side surface 451 and a concave image-side surface 452, and both object-side surface 451 and image-side surface 452 being aspheric, and the image-side surface 452 having at least one inflection point (see small circles in FIG. 4A); an IR-filter 460, made of panel glass, without affecting the focal length of the optical lens assembly for image taking; and an image sensor 480 at an image plane 470.

TABLE 10

Optical data of the fourth preferred embodiment
f = 3.00 mm, Fno = 2.45, HFOV = 36.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | | 4.740800 (ASP) | 0.843 | | | | |
|   | Lens 1 | | | Plastic | 1.544 | 55.9 | 2.23 |
| 2 | | −1.529300 (ASP) | −0.088 | | | | |
| 3 | Ape. Stop | Plano | 0.126 | | | | |
| 4 | | 4.227700 (ASP) | 0.256 | | | | |
|   | Lens 2 | | | Plastic | 1.650 | 21.4 | −4.26 |
| 5 | | 1.631870 (ASP) | 0.501 | | | | |
| 6 | | −27.777800 (ASP) | 0.294 | | | | |
|   | Lens 3 | | | Plastic | 1.650 | 21.4 | −10.90 |
| 7 | | 9.546100 (ASP) | 0.132 | | | | |
| 8 | | −4.793900 (ASP) | 0.807 | | | | |
|   | Lens 4 | | | Plastic | 1.544 | 55.9 | 1.45 |
| 9 | | −0.716040 (ASP) | 0.183 | | | | |
| 10 | | −46.938000 (ASP) | 0.398 | | | | |
|   | Lens 5 | | | Plastic | 1.530 | 55.8 | −1.44 |
| 11 | | 0.778550 (ASP) | 0.500 | | | | |
| 12 | | Plano | 0.200 | | | | |
|   | IR-filter | | | Glass | 1.517 | 64.2 | — |
| 13 | | Plano | 0.338 | | | | |
| 14 | Image | Plano | — | | | | |

Note:
Reference wavelength is 587.6 nm. ASP stands for aspherical surfaces.

The optical data of this preferred embodiment are listed in Table 10, wherein the object-side surfaces and the image-side surfaces of the first lens element 410 to the fifth lens element 450 comply with the aspherical surface formula as given in Equation (14), and their aspheric coefficients are listed in Table 11 as follows:

TABLE 11

Aspheric coefficients of the fourth preferred embodiment

| Surface # | 1 | 2 | 4 | 5 | 6 |
|---|---|---|---|---|---|
| k = | −1.43485E+02 | −1.24769E+01 | −8.57062E+00 | −1.45624E+01 | −1.00000E+00 |
| A4 = | 7.02403E−02 | −1.04406E−01 | 4.17329E−03 | −2.89393E−02 | −3.02041E−01 |
| A6 = | −2.56188E−01 | −9.41948E−02 | −8.72953E−02 | 9.55910E−03 | −1.46985E−01 |
| A8 = | 2.39831E−01 | 2.50360E−01 | 2.54476E−01 | −8.37638E−02 | 4.30998E−01 |
| A10 = | −1.51837E−01 | −1.91942E−01 | −6.74209E−01 | −2.43424E−01 | −3.56085E−01 |
| A12 = | 4.86385E−02 | −8.08693E−02 | 8.27200E−01 | 3.71523E−01 | 1.69578E−01 |
| A14 = | −2.53323E−02 | 9.98920E−03 | −3.88301E−01 | −1.46767E−01 | −7.81456E−05 |

| Surface # | 7 | 8 | 9 | 10 | 11 |
|---|---|---|---|---|---|
| k = | −1.00000E+00 | 1.26186E+01 | −3.40910E+00 | −1.00000E+00 | −5.79898E+00 |
| A4 = | −1.94948E−01 | 5.85946E−02 | −1.53074E−01 | −4.82332E−02 | −8.26518E−02 |
| A6 = | −6.25439E−02 | 6.25502E−02 | 1.80218E−01 | −6.30240E−02 | 2.70388E−02 |
| A8 = | 1.49949E−01 | −2.17264E−01 | −1.15799E−01 | 4.25710E−02 | −9.74785E−03 |
| A10 = | −6.07251E−02 | 3.00952E−01 | 6.74532E−02 | −5.26664E−03 | 2.57173E−03 |
| A12 = | 4.35824E−02 | −1.73183E−01 | −1.75116E−02 | −2.04721E−03 | −4.43064E−04 |
| A14 = | −8.37219E−03 | 3.69773E−02 | 1.83301E−04 | 3.86326E−04 | 2.97028E−05 |

With reference to Table 10 and FIG. 4B for an optical system for imaging pickup of this preferred embodiment, the optical system for imaging pickup has a focal length f=3.00 (mm), an f-number Fno=2.45, and a half of maximum view angle HFOV=36.3°. After the optical data of this preferred embodiment are calculated and derived, the optical system for imaging pickup satisfies related conditions as shown in Table 12 below, and the related symbols have been described above and thus will not be described again.

TABLE 12

Data of related relations of the fourth preferred embodiment

| Relation | Data |
| --- | --- |
| $|R_1|/R_2$ | −3.10 |
| $R_2/R_4$ | −0.94 |
| $f_1/f$ | 0.74 |
| $|f_2/f_3|$ | 0.39 |
| $f_4/f$ | 0.48 |
| $f_5/f$ | −0.48 |
| $|f/f_4| + |f/f_5|$ | 4.16 |
| $S_D/T_D$ | 0.78 |
| ImgH/f | 0.75 |
| TTL/ImgH | 1.97 |

According to the optical data as shown in Table 10 and the series of aberration curves as shown in FIG. 4B, the optical system for imaging pickup in accordance with this preferred embodiment of the present invention provides good correction results in aspects of the longitudinal spherical aberration, astigmatic field curving, and distortion.

Fifth Preferred Embodiment

Figure 5A:
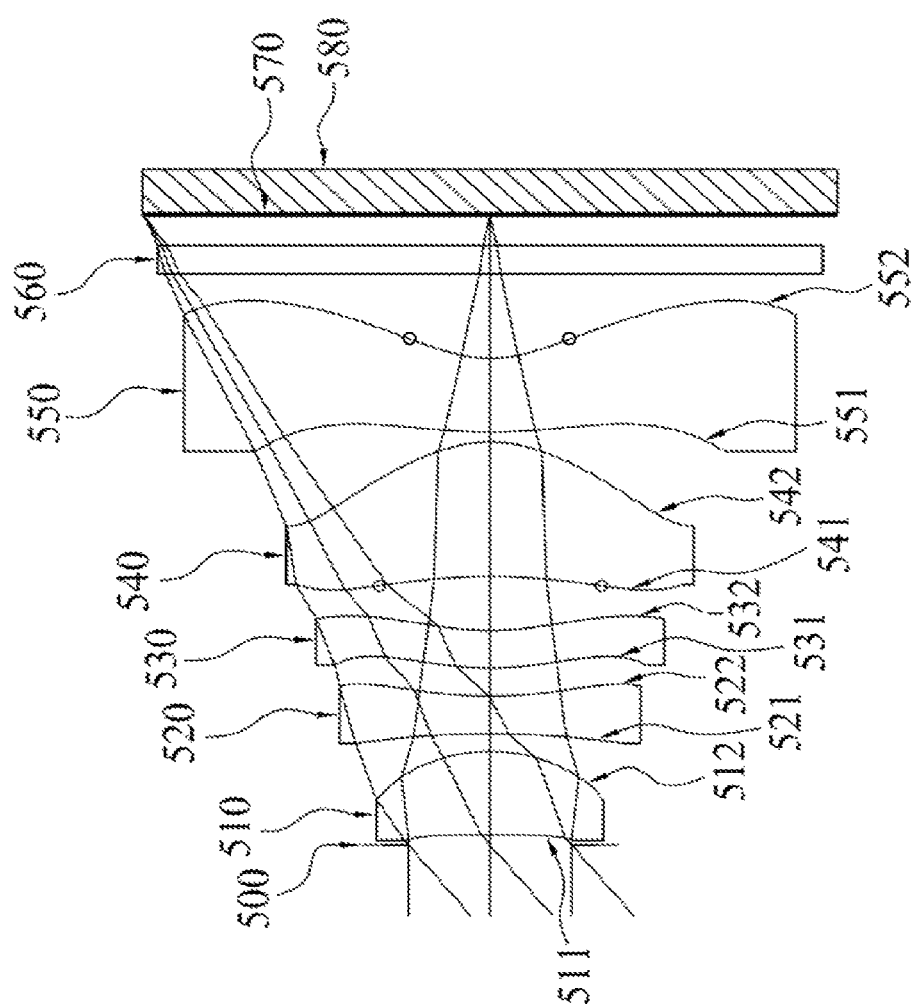
FIG. 5A is a schematic view of an optical system for imaging pickup in accordance with the fifth preferred embodiment of the present invention.
Figure 5B:
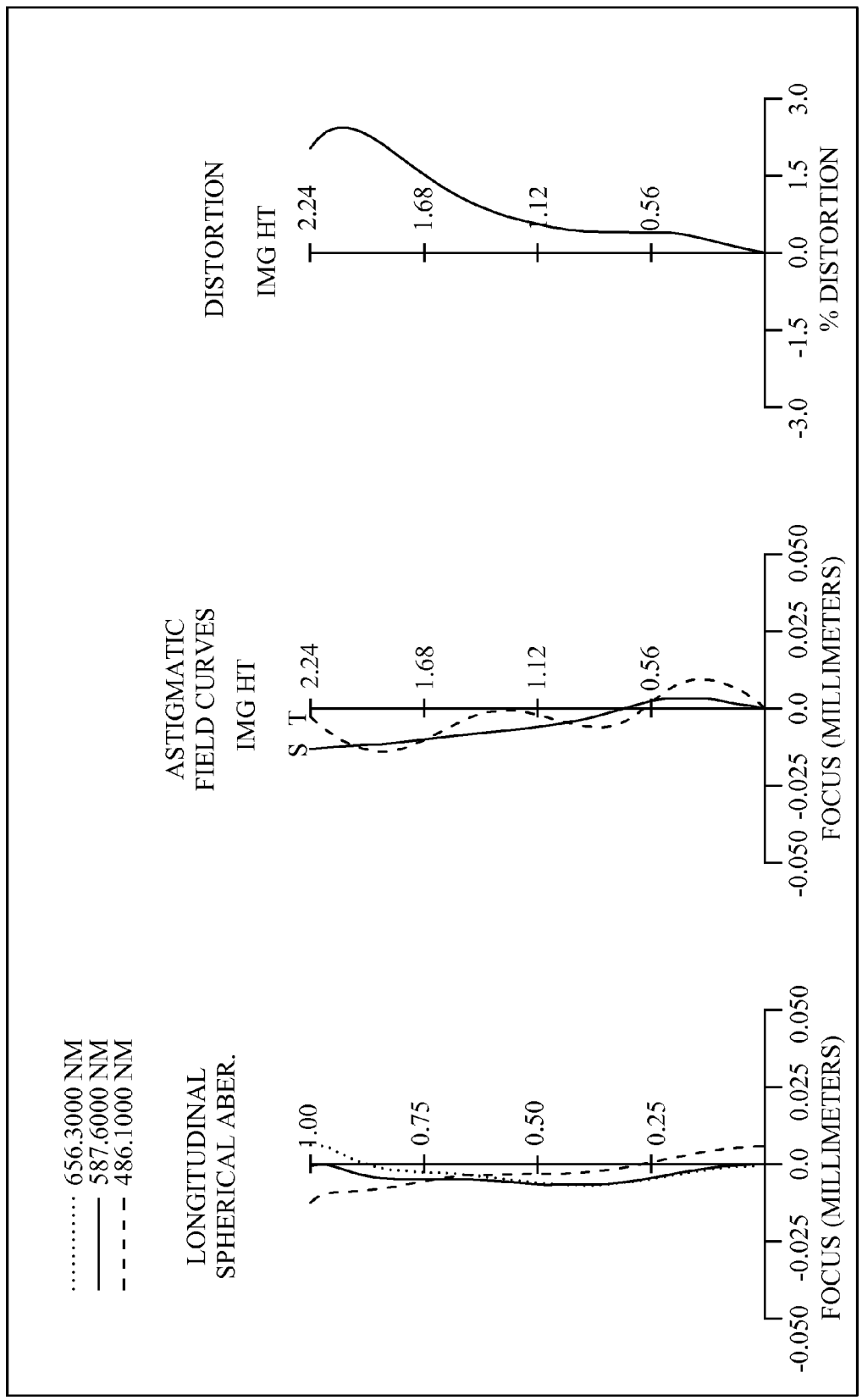
FIG. 5B is a schematic view of a series of aberration curves of the fifth preferred embodiment of the present invention.

With reference to FIGS. 5A and 5B for a schematic view and a series of aberration curves of an optical system for imaging pickup in accordance with the fifth preferred embodiment of the present invention respectively, the optical system for imaging pickup, sequentially arranged from an object side to an image side along an optical axis, comprises: a stop, which can be an aperture stop 500; the plastic first lens element 510 with positive refractive power having a concave object-side surface 511 and a convex image-side surface 512 and both object-side surface 511 and image-side surface 512 being aspheric; the plastic second lens element 520 with negative refractive power having a concave object-side surface 521 and a concave image-side surface 522, and both object-side surface 521 and image-side surface 522 being aspheric; the plastic third lens element 530 with positive refractive power having a convex object-side surface 531 and a concave image-side surface 532, and both object-side surface 531 and image-side surface 532 being aspheric; the plastic fourth lens element 540 with positive refractive power having a concave object-side surface 541 and a convex image-side surface 542, and both object-side surface 541 and image-side surface 542 being aspheric, and at least one of the object-side surface 541 and image-side surface 542 has at least one inflection point (see small circles in FIG. 5A); the plastic fifth lens element 550 with negative refractive power having a convex object-side surface 551 and a concave image-side surface 552, and both object-side surface 551 and image-side surface 552 being aspheric, and both of the object-side surface 551 and image-side surface 552 having at least one inflection point (see small circles in FIG. 5A); an IR-filter 560, made of panel glass, without affecting the focal length of the optical lens assembly for image taking; and an image sensor 580 at an image plane 570.

TABLE 13

Optical data of the fifth preferred embodiment
f = 2.74 mm, Fno = 2.60, HFOV = 38.8 deg.

| Surface # | | Curvature Radius | Thickness | Material | Index | Abbe # | Focal length |
| --- | --- | --- | --- | --- | --- | --- | --- |
| 0 | Object | Plano | Infinity | | | | |
| 1 | Ape. Stop | Plano | 0.072 | | | | |
| 2 | | −50.000000 (ASP) | 0.590 | | | | |
| | Lens 1 | | | Plastic | 1.544 | 55.9 | 1.88 |
| 3 | | −1.007210 (ASP) | 0.125 | | | | |
| 4 | | −5.967000 (ASP) | 0.265 | | | | |
| | Lens 2 | | | Plastic | 1.634 | 23.8 | −2.51 |
| 5 | | 2.204880 (ASP) | 0.200 | | | | |
| 6 | | 1.678780 (ASP) | 0.268 | | | | |
| | Lens 3 | | | Plastic | 1.614 | 25.6 | 30.80 |
| 7 | | 1.730380 (ASP) | 0.383 | | | | |
| 8 | Lens 4 | −3.189700 (ASP) | 0.947 | Plastic | 1.544 | 55.9 | 1.64 |
| 9 | | −0.770610 (ASP) | 0.070 | | | | |
| 10 | | 3.063200 (ASP) | 0.522 | | | | |
| | Lens 5 | | | Plastic | 1.530 | 55.8 | −1.87 |
| 11 | | 0.703630 (ASP) | 0.600 | | | | |
| 12 | | Plano | 0.200 | | | | |
| | IR-filter | | | Glass | 1.517 | 64.2 | — |
| 13 | | Plano | 0.219 | | | | |
| 14 | Image | Plano | — | | | | |

Note:
Reference wavelength is 587.6 nm. ASP stands for aspherical surfaces.

The optical data of this preferred embodiment are listed in Table 13, wherein the object-side surfaces and the image-side surfaces of the first lens element 510 to the fifth lens element 550 comply with the aspherical surface formula as given in Equation (14), and their aspheric coefficients are listed in Table 14 as follows:

TABLE 14

Aspheric coefficients of the fifth preferred embodiment

| Surface # | 2 | 3 | 4 | 5 | 6 |
|---|---|---|---|---|---|
| k = | 5.00000E+01 | −1.53393E+00 | 2.18459E+00 | −1.80052E+01 | −8.43001E+00 |
| A4 = | −2.64255E−01 | −1.60376E−01 | −1.18068E−02 | −4.02985E−03 | −1.37121E−01 |
| A6 = | −4.07896E−01 | −2.15120E−01 | −1.17286E−01 | −6.89948E−02 | −7.54539E−02 |
| A8 = | 3.43635E−01 | −1.13900E−01 | 4.53181E−01 | 1.19529E−01 | 2.38932E−01 |
| A10 = | −1.89213E+00 | 1.71239E−01 | −7.61441E−01 | −3.51522E−01 | −3.13697E−01 |
| A12 = | −4.80222E−01 | 2.07620E−02 | 8.43063E−01 | 3.91536E−01 | 1.06673E−01 |
| A14 = | −2.44535E−02 | −9.47834E−01 | −4.34136E−01 | −1.73685E−01 | |

| Surface # | 7 | 8 | 9 | 10 | 11 |
|---|---|---|---|---|---|
| k = | −7.77345E+00 | 4.53754E+00 | −3.58026E+00 | −1.00000E+00 | −4.31611E+00 |
| A4 = | −1.11116E−01 | 6.94257E−02 | −1.52163E−01 | −1.19058E−01 | −8.58249E−02 |
| A6 = | −5.38756E−02 | 6.61490E−02 | 1.45093E−01 | −1.02667E−01 | 3.24380E−02 |
| A8 = | 1.22588E−01 | −2.15497E−01 | −1.13089E−01 | 2.39779E−02 | −9.76448E−03 |
| A10 = | −9.72693E−02 | 3.05921E−01 | 6.79795E−02 | −6.66019E−03 | 1.91827E−03 |
| A12 = | 3.00711E−02 | −1.71764E−01 | −1.68199E−02 | −1.48291E−03 | −2.32832E−04 |
| A14 = | | 3.55160E−02 | 2.06726E−03 | 6.41423E−04 | 1.04591E−05 |

With reference to Table 13 and FIG. 5B for an optical system for imaging pickup of this preferred embodiment, the optical system for imaging pickup has a focal length f=2.74 (mm), an f-number Fno=2.60, and a half of maximum view angle HFOV=38.8°. After the optical data of this preferred embodiment are calculated and derived, the optical system for imaging pickup satisfies related conditions as shown in Table 15 below, and the related symbols have been described above and thus will not be described again.

TABLE 15

Data of related of the fifth preferred embodiment

| Relation | Data |
|---|---|
| $|R_1|/R_2$ | −49.64 |
| $R_2/R_4$ | −0.46 |
| $f_1/f$ | 0.69 |
| $|f_2/f_3|$ | 0.08 |
| $f_4/f$ | 0.60 |
| $f_5/f$ | −0.68 |
| $|f/f_4| + |f/f_5|$ | 3.14 |
| $S_D/T_D$ | 1.02 |
| ImgH/f | 0.82 |
| TTL/ImgH | 1.93 |

According to the optical data as shown in Table 13 and the series of aberration curves as shown in FIG. 5B, the optical system for imaging pickup in accordance with this preferred embodiment of the present invention provides good correction results in aspects of the longitudinal spherical aberration, astigmatic field curving, and distortion.

Sixth Preferred Embodiment

Figure 6A:
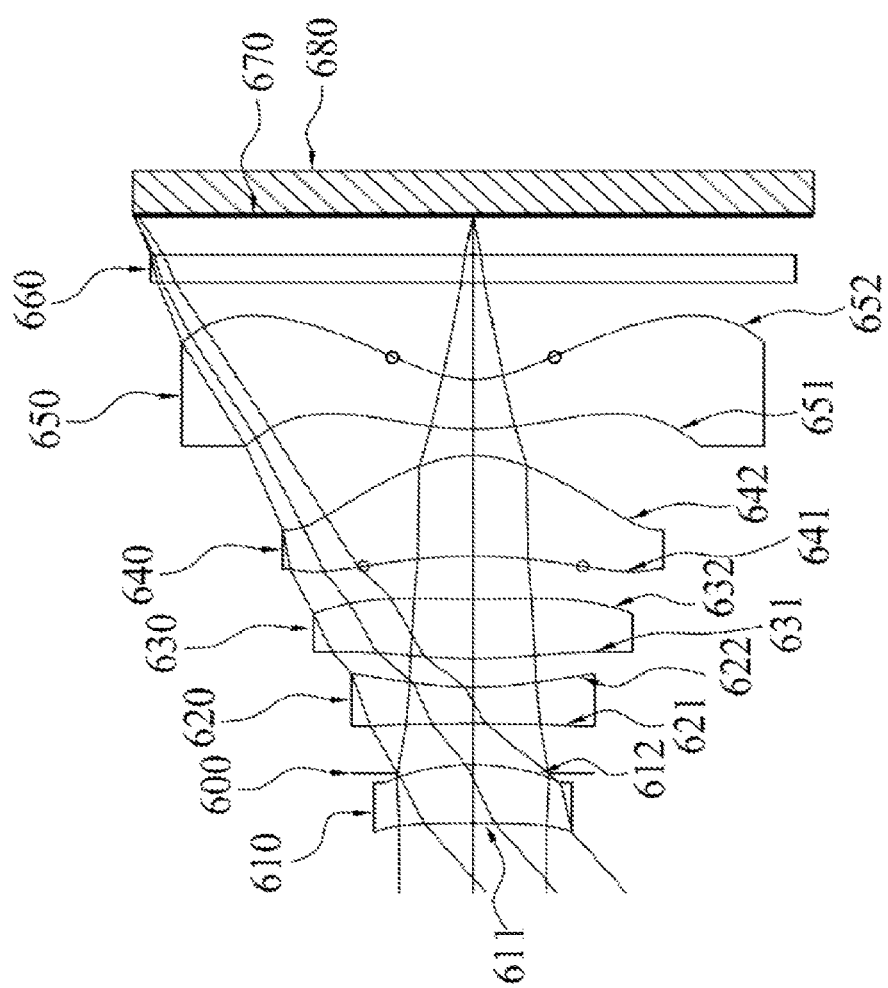
FIG. 6A is a schematic view of an optical system for imaging pickup in accordance with the sixth preferred embodiment of the present invention.
Figure 6B:
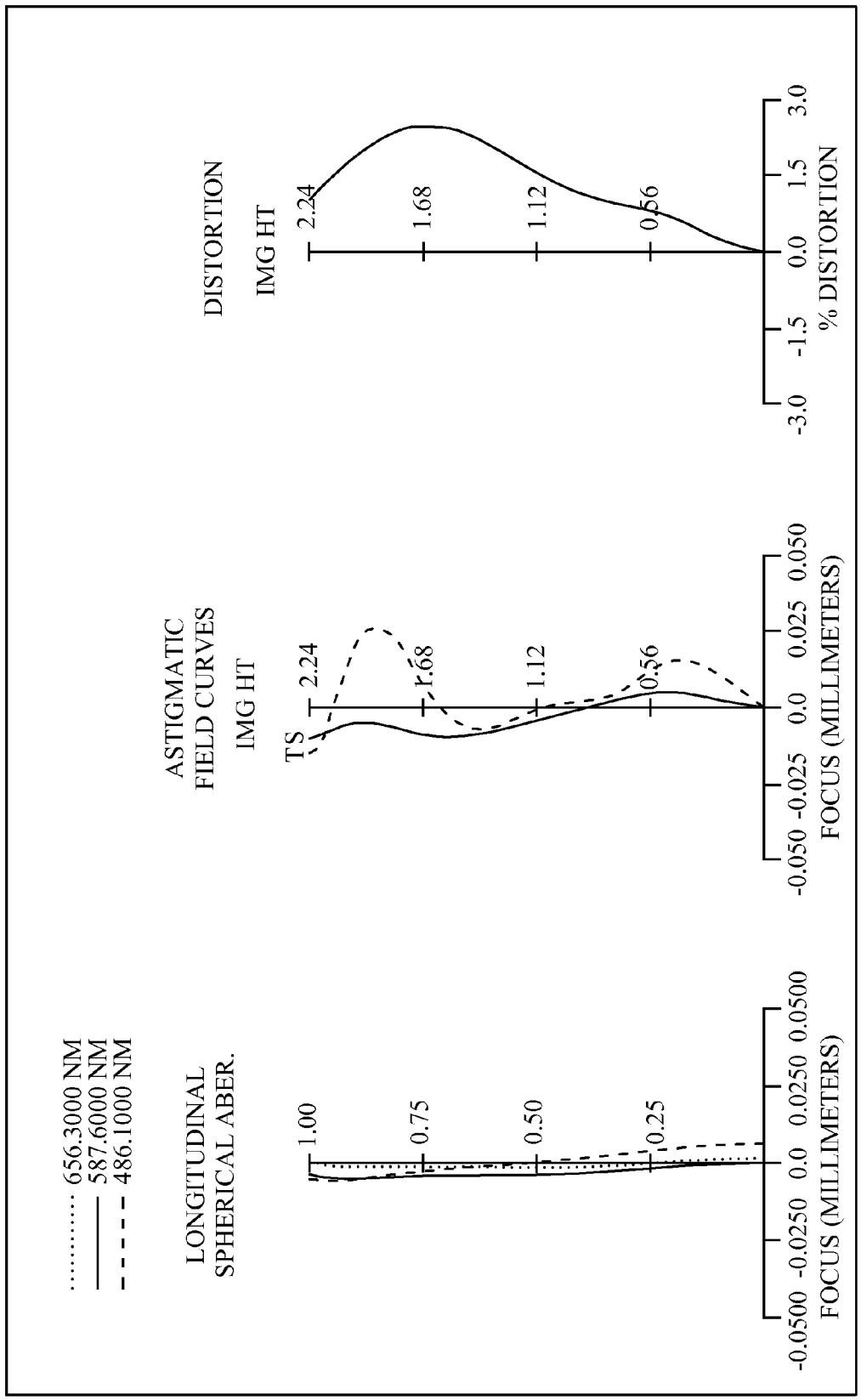
FIG. 6B is a schematic view of a series of aberration curves of the sixth preferred embodiment of the present invention.

With reference to FIGS. 6A and 6B for a schematic view and a series of aberration curves of an optical system for imaging pickup in accordance with the sixth preferred embodiment of the present invention respectively, the optical system for imaging pickup, sequentially arranged from an object side to an image side along an optical axis, comprises: the plastic first lens element 610 with positive refractive power having a concave object-side surface 611 and a convex image-side surface 612 and both object-side surface 611 and image-side surface 612 being aspheric; a stop, which can be an aperture stop 600; the plastic second lens element 620 with negative refractive power having a concave object-side surface 621 and a concave image-side surface 622, and both object-side surface 621 and image-side surface 622 being aspheric; the plastic third lens element 630 with positive refractive power having a convex object-side surface 631 and a concave image-side surface 632, and both object-side surface 631 and image-side surface 632 being aspheric; the plastic fourth lens element 640 with positive refractive power having a concave object-side surface 641 and a convex image-side surface 642, and both object-side surface 641 and image-side surface 642 being aspheric, and at least one of the object-side surface 641 and image-side surface 642 has at least one inflection point (see small circles in FIG. 6A); the plastic fifth lens element 650 with negative refractive power having a convex object-side surface 651 and a concave image-side surface 652, and both object-side surface 651 and image-side surface 652 being aspheric, and both of the object-side surface 651 and image-side surface 652 having at least one inflection point (see small circles in FIG. 6A); an IR-filter 660, made of panel glass, without affecting the focal length of the optical lens assembly for image taking; and an image sensor 680 at an image plane 670.

TABLE 16

Optical data of the sixth preferred embodiment
f = 2.72 mm, Fno = 2.80, HFOV = 39.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | | −18.181800 (ASP) | 0.423 | | | | |
| | Lens 1 | | | Plastic | 1.535 | 56.3 | 2.90 |
| 2 | | −1.438770 (ASP) | −0.060 | | | | |
| 3 | Ape. Stop | Plano | 0.357 | | | | |

TABLE 16-continued

Optical data of the sixth preferred embodiment
f = 2.72 mm, Fno = 2.80, HFOV = 39.3 deg.

| Surface # | | Curvature Radius | Thickness | Material | Index | Abbe # | Focal length |
|---|---|---|---|---|---|---|---|
| 4 | | −12.500000 (ASP) | 0.265 | | | | |
| | Lens 2 | | | Plastic | 1.650 | 21.4 | −3.15 |
| 5 | | 2.467840 (ASP) | 0.205 | | | | |
| 6 | | 2.867950 (ASP) | 0.430 | | | | |
| | Lens 3 | | | Plastic | 1.535 | 56.3 | 7.37 |
| 7 | | 10.000000 (ASP) | 0.311 | | | | |
| 8 | | −3.081200 (ASP) | 0.723 | | | | |
| | Lens 4 | | | Plastic | 1.535 | 56.3 | 1.65 |
| 9 | | −0.742190 (ASP) | 0.191 | | | | |
| 10 | | 1.864760 (ASP) | 0.358 | | | | |
| | Lens 5 | | | Plastic | 1.535 | 56.3 | −1.91 |
| 11 | | 0.615860 (ASP) | 0.700 | | | | |
| 12 | IR-filter | Plano | 0.200 | Glass | 1.517 | 64.2 | — |
| 13 | | Plano | 0.288 | | | | |
| 14 | Image | Plano | | | | | |

Note:
Reference wavelength is 587.6 nm. ASP stands for aspherical surfaces.

The optical data of this preferred embodiment are listed in Table 16, wherein the object-side surfaces and the image-side surfaces of the first lens element 610 to the fifth lens element 650 comply with the aspherical surface formula as given in Equation (14), and their aspheric coefficients are listed in Table 17 as follows:

TABLE 17

Aspheric coefficients of the sixth preferred embodiment

| Surface # | 1 | 2 | 4 | 5 | 6 |
|---|---|---|---|---|---|
| k = | 5.00000E+01 | −2.62383E+00 | 3.00000E+00 | −8.44258E+00 | −2.00000E+01 |
| A4 = | −1.83589E−01 | −1.23340E−01 | 1.06835E−01 | 7.45311E−03 | −1.10394E−01 |
| A6 = | −1.27966E−01 | −1.50107E−01 | −3.45678E−01 | −8.76993E−02 | −5.61671E−02 |
| A8 = | −1.10772E−01 | −2.12846E−01 | 3.27273E−01 | 1.20798E−01 | 2.56874E−01 |
| A10 = | −3.28810E−01 | 3.91032E−01 | 3.63783E−01 | −2.12830E−01 | −2.70683E−01 |
| A12 = | 1.03972E+00 | 2.80533E−01 | −2.32682E+00 | 6.70465E−02 | 1.05955E−01 |
| A14 = | −1.97349E+00 | −1.04942E+00 | 2.63146E+00 | 7.92465E−02 | |

| Surface # | 7 | 8 | 9 | 11 | 10 |
|---|---|---|---|---|---|
| k = | −3.43437E+00 | 4.35456E+00 | −3.29210E+00 | −3.22044E+00 | −1.00000E+00 |
| A4 = | −1.33788E−01 | 5.94254E−02 | −1.29128E−01 | −1.06229E−01 | −1.66421E−01 |
| A6 = | −7.57646E−02 | 6.96701E−02 | 1.34875E−01 | 4.01588E−02 | −6.47463E−03 |
| A8 = | 1.36176E−01 | −2.16913E−01 | −1.08603E−01 | −1.25954E−02 | 2.19366E−02 |
| A10 = | −8.85539E−02 | 3.05901E−01 | 7.38133E−02 | 2.01455E−03 | −7.03720E−03 |
| A12 = | 2.61340E−02 | −1.70856E−01 | −1.55639E−02 | −1.60170E−04 | −1.35853E−03 |
| A14 = | | 3.59974E−02 | 6.35119E−04 | 1.40774E−06 | 7.08554E−04 |

With reference to Table 16 and FIG. 6B for an optical system for imaging pickup of this preferred embodiment, the optical system for imaging pickup has a focal length f=2.72 (mm), an f-number Fno=2.80, and a half of maximum view angle HFOV=39.3°. After the optical data of this preferred embodiment are calculated and derived, the optical system for imaging pickup satisfies related conditions as shown in Table 18 below, and the related symbols have been described above and thus will not be described again.

TABLE 18

Data of related relations of the sixth preferred embodiment

| Relation | Data |
|---|---|
| $|R_1|/R_2$ | −12.64 |
| $R_2/R_4$ | −0.58 |

TABLE 18-continued

Data of related relations of the sixth preferred embodiment

| Relation | Data |
|---|---|
| $f_1/f$ | 1.07 |
| $|f_2/f_3|$ | 0.43 |
| $f_4/f$ | 0.61 |
| $f_5/f$ | −0.70 |
| $|f/f_4| + |f/f_5|$ | 3.07 |
| $S_D/T_D$ | 0.89 |
| ImgH/f | 0.83 |
| TTL/ImgH | 1.93 |

According to the optical data as shown in Table 16 and the series of aberration curves as shown in FIG. 6B, the optical system for imaging pickup in accordance with this preferred embodiment of the present invention provides good correction results in aspects of the longitudinal spherical aberration, astigmatic field curving, and distortion.

Seventh Preferred Embodiment

Figure 7A:
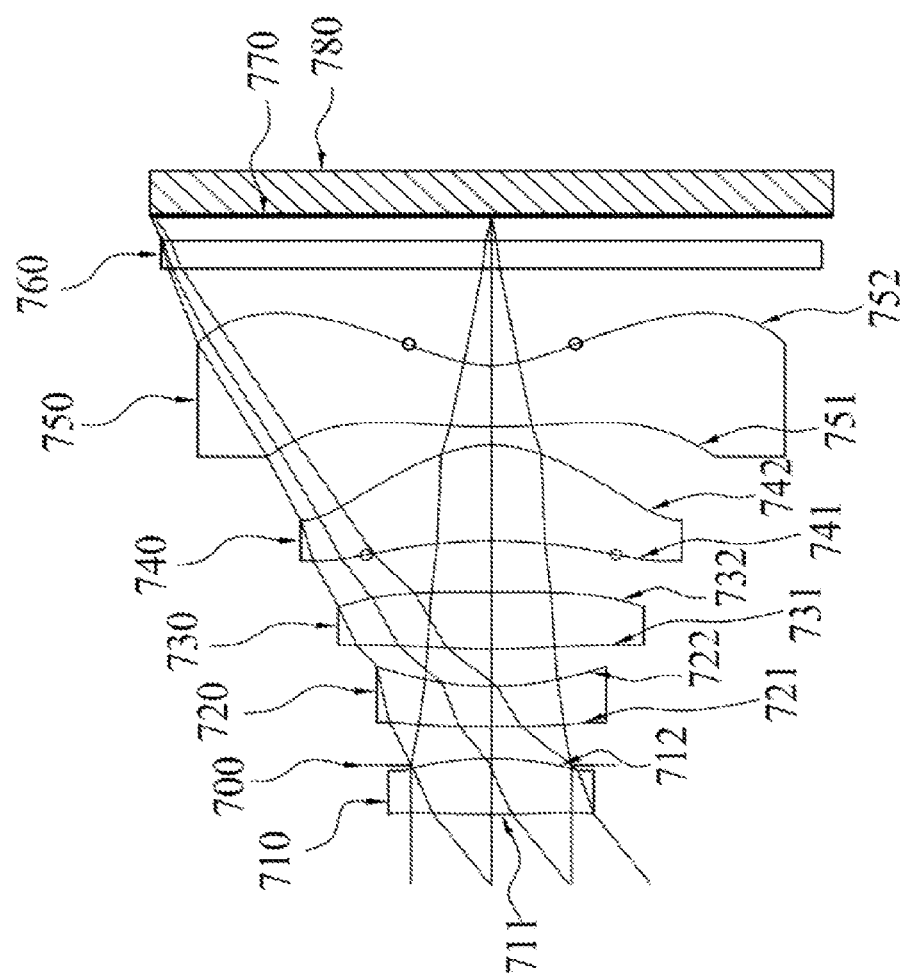
FIG. 7A is a schematic view of an optical system for imaging pickup in accordance with the seventh preferred embodiment of the present invention.
Figure 7B:
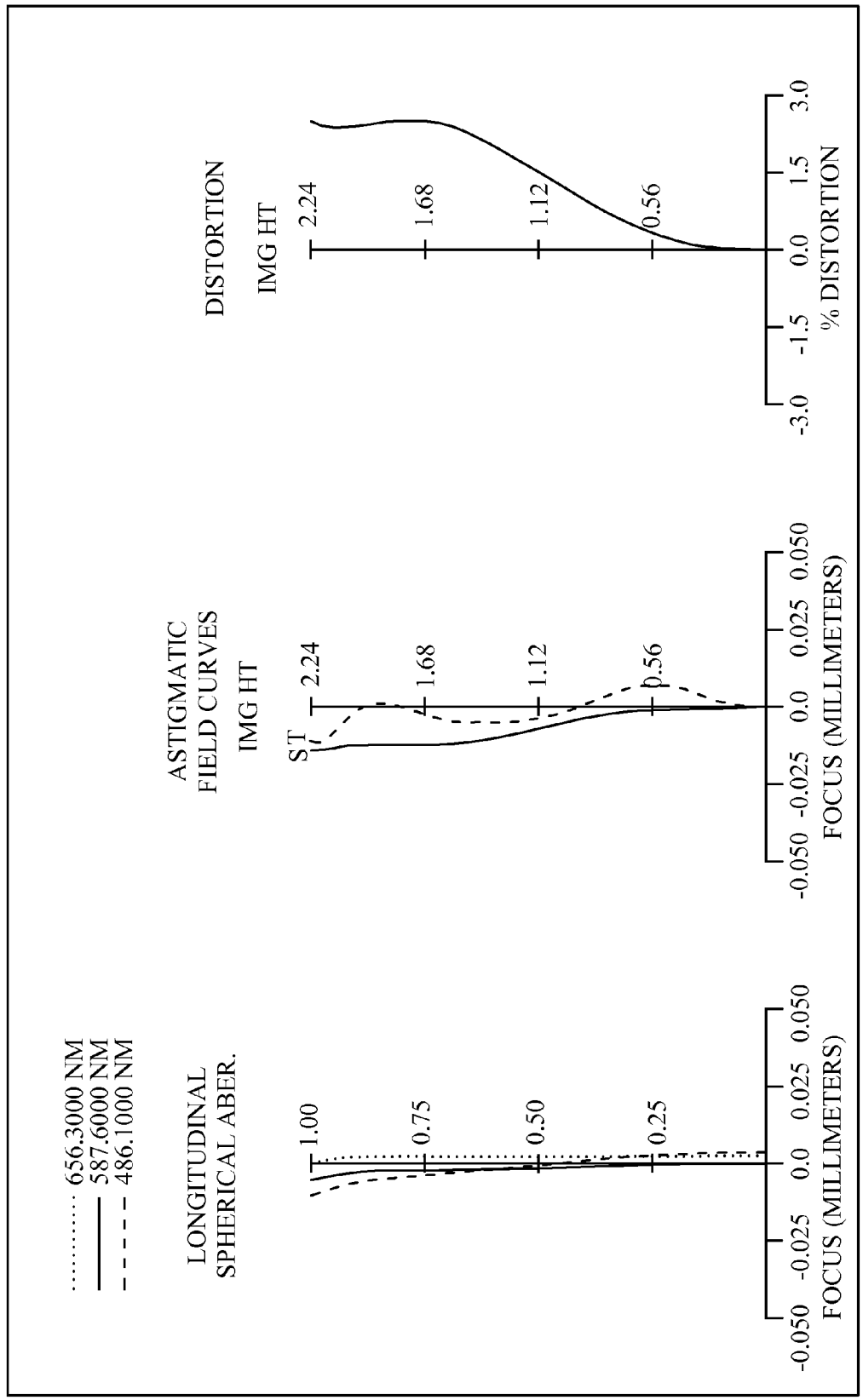
FIG. 7B is a schematic view of a series of aberration curves of the seventh preferred embodiment of the present invention.

With reference to FIGS. 7A and 7B for a schematic view and a series of aberration curves of an optical system for imaging pickup in accordance with the seventh preferred embodiment of the present invention respectively, the optical system for imaging pickup, sequentially arranged from an object side to an image side along an optical axis, comprises: the plastic first lens element 710 with positive refractive power having a convex object-side surface 711 and a convex image-side surface 712 and both object-side surface 711 and image-side surface 712 being aspheric; a stop, which can be an aperture stop 700; the plastic second lens element 720 with negative refractive power having a convex object-side surface 721 and a concave image-side surface 722, and both object-side surface 721 and image-side surface 722 being aspheric; the plastic third lens element 730 with positive refractive power having a convex object-side surface 731 and a convex image-side surface 732, and both object-side surface 731 and image-side surface 732 being aspheric; the plastic fourth lens element 740 with positive refractive power having a concave object-side surface 741 and a convex image-side surface 742, and both object-side surface 741 and image-side surface 742 being aspheric, and at least one of the object-side surface 741 and image-side surface 742 has at least one inflection point (see small circles in FIG. 7A); the plastic fifth lens element 750 with negative refractive power having a convex object-side surface 751 and a concave image-side surface 752, and both object-side surface 751 and image-side surface 752 being aspheric, and both of the object-side surface 751 and image-side surface 752 having at least one inflection point (see small circles in FIG. 7A); an IR-filter 760, made of panel glass, without affecting the focal length of the optical lens assembly for image taking; and an image sensor 780 at an image plane 770.

TABLE 19

Optical data of the seventh preferred embodiment
f = 2.96 mm, Fno = 2.80, HFOV = 36.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | | 5.516400 (ASP) | 0.400 | | | | |
| | Lens 1 | | | Plastic | 1.544 | 55.9 | 2.85 |
| 2 | | −2.101140 (ASP) | −0.045 | | | | |
| 3 | Ape. Stop | Plano | 0.277 | | | | |
| 4 | | 9.529900 (ASP) | 0.290 | | | | |
| | Lens 2 | | | Plastic | 1.650 | 21.4 | −3.63 |
| 5 | | 1.867120 (ASP) | 0.267 | | | | |
| 6 | | 4.309500 (ASP) | 0.411 | | | | |
| | Lens 3 | | | Plastic | 1.543 | 56.5 | 7.78 |
| 7 | | −222.005800 (ASP) | 0.368 | | | | |
| 8 | | −3.026700 (ASP) | 0.690 | | | | |
| | Lens 4 | | | Plastic | 1.514 | 56.8 | 1.68 |
| 9 | | −0.723270 (ASP) | 0.130 | | | | |
| 10 | | 3.716900 (ASP) | 0.440 | | | | |
| | Lens 5 | | | Plastic | 1.530 | 55.8 | −1.62 |
| 11 | | 0.669090 (ASP) | 0.700 | | | | |
| 12 | | Plano | 0.200 | | | | |
| | IR-filter | | | Glass | 1.517 | 64.2 | — |
| 13 | | Plano | 0.181 | | | | |
| 14 | Image | Plano | — | | | | |

Note:
Reference wavelength is 587.6 nm. ASP stands for aspherical surfaces.

The optical data of this preferred embodiment are listed in Table 19, wherein the object-side surfaces and the image-side surfaces of the first lens element 710 to the fifth lens element 750 comply with the aspherical surface formula as given in Equation (14), and their aspheric coefficients are listed in Table 20 as follows:

TABLE 20

Aspheric coefficients of the seventh preferred embodiment

| Surface # | 1 | 2 | 4 | 5 | 6 |
|---|---|---|---|---|---|
| k = | 4.79685E+01 | −6.66867E+00 | 3.00000E+00 | −4.30281E+00 | −8.58192E+00 |
| A4 = | −1.64173E−01 | −7.91033E−02 | 1.02530E−01 | 3.20005E−02 | −1.20354E−01 |
| A6 = | −5.43124E−02 | −1.52212E−01 | −2.63808E−01 | −5.90405E−02 | −5.01619E−02 |
| A8 = | −3.54434E−01 | −5.85099E−02 | 3.43161E−01 | 1.31413E−01 | 2.50253E−01 |
| A10 = | 7.95098E−02 | 1.82446E−01 | 3.53869E−01 | −2.11324E−01 | −2.55920E−01 |
| A12 = | 1.03152E+00 | 2.81019E−01 | −2.32687E+00 | 6.34594E−02 | 1.19385E−01 |
| A14 = | −1.97355E+00 | −1.04946E+00 | 2.63142E+00 | 1.17520E−01 | |

TABLE 20-continued

Aspheric coefficients of the seventh preferred embodiment

| Surface # | 7 | 8 | 9 | 11 | 10 |
|---|---|---|---|---|---|
| k = | −2.00000E+01 | 4.45444E+00 | −3.42382E+00 | −4.35640E+00 | −1.00000E+00 |
| A4 = | −9.17196E−02 | 4.46124E−02 | −1.26749E−01 | −9.41956E−02 | −1.44380E−01 |
| A6 = | −9.95546E−02 | 6.65981E−02 | 1.33660E−01 | 3.59961E−02 | 1.64936E−03 |
| A8 = | 1.37767E−01 | −2.15742E−01 | −1.07660E−01 | −1.13323E−01 | 2.14288E−02 |
| A10 = | −7.45911E−02 | 3.07424E−01 | 7.40354E−02 | 1.85296E−03 | −7.18107E−03 |
| A12 = | 2.56752E−02 | −1.70631E−01 | −1.60621E−02 | −1.79998E−04 | −1.31822E−03 |
| A14 = | | 3.58601E−02 | 5.52373E−05 | 7.01791E−06 | 7.22255E−04 |

With reference to Table 19 and FIG. 7B for an optical system for imaging pickup of this preferred embodiment, the optical system for imaging pickup has a focal length f=2.96 (mm), an f-number Fno=2.80, and a half of maximum view angle HFOV=36.5°. After the optical data of this preferred embodiment are calculated and derived, the optical system for imaging pickup satisfies related conditions as shown in Table 21 below, and the related symbols have been described above and thus will not be described again.

TABLE 21

Data of related relations of the seventh preferred embodiment

| Relation | Data |
|---|---|
| $|R_1|/R_2$ | −2.63 |
| $R_2/R_4$ | −1.13 |
| $f_1/f$ | 0.96 |
| $|f_2/f_3|$ | 0.47 |
| $f_4/f$ | 0.57 |
| $f_5/f$ | −0.55 |
| $|f/f_4| + |f/f_5|$ | 3.58 |
| $S_D/T_D$ | 0.89 |
| ImgH/f | 0.76 |
| TTL/ImgH | 1.89 |

According to the optical data as shown in Table 19 and the series of aberration curves as shown in FIG. 7B, the optical system for imaging pickup in accordance with this preferred embodiment of the present invention provides good correction results in aspects of the longitudinal spherical aberration, astigmatic field curving, and distortion.

In the optical system for imaging pickup of the present invention, the lens elements can be made of glass or plastic material. If the lens elements are made of glass, the freedom for distributing the refractive power of the optical system for imaging pickup can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements used in an optical system. Consequently, the total track length of the image capturing lens assembly can be effectively reduced.

In the optical system for imaging pickup of the present invention, if the lens element has a convex surface, then the surface of the lens element is convex at a position in proximity to the optical axis; and if the lens element has a concave surface, then the surface of the lens element is concave at a position in proximity to the optical axis.

In the optical system for imaging pickup of the present invention, at least one stop such as a glare stop or a field stop is provided for reducing stray lights to improve the image quality, limiting the image field size, or other functionalities.

At least one stop can be positioned in front of the first lens element, between lens elements, or before the image plane of the optical system for imaging pickup according to the preference of the optical designer. Additionally, the optical system for imaging pickup can be utilized in 3D (three-dimensional) applications.

In the optical system for imaging pickup of the present invention, the aperture stop can be a front or middle aperture stop. If the aperture stop is a front aperture stop, a longer distance between the exit pupil of the optical system for imaging pickup and the image plane can be achieved to provide the telecentric effect and improve the image receiving efficiency of the image sensor such as the CCD or CMOS. If the aperture stop is a middle aperture stop, the view angle of the system can be expanded to provide a wide angle lens of the optical system for imaging pickup.

Tables 1 to 21 show changes of values of an optical imaging lens assembly in accordance with different preferred embodiments of the present invention respectively, and even if different values are used, products of the same structure are intended to be covered by the scope of the present invention.

It is noteworthy to point out that the aforementioned description and the illustration of related drawings are provided for the purpose of explaining the technical characteristics of the present invention, but not intended for limiting the scope of the present invention.

What is claimed is:

1. An optical system for imaging pickup, sequentially arranged from an object side to an image side, comprising:
   a first lens element with positive refractive power, having a convex image-side surface;
   a second lens element with refractive power, having a concave image-side surface;
   a third lens element with refractive power;
   a fourth lens element with refractive power, having both object-side surface and image-side surface being aspheric; and
   a fifth lens element with negative refractive power, having a concave image-side surface, both object-side surface and image-side surface being aspheric, and at least one of the object-side surface and the image-side surface having at least one inflection point; wherein, $R_1$ is a curvature radius of the object-side surface of the first lens element, $R_2$ is a curvature radius of the image-side surface of the first lens element, f is a focal length of the optical system for imaging pickup, $f_1$ is a focal length of the first lens element, $f_5$ is a focal length of the fifth lens element, and the following relations are satisfied:

$|R_1|/R_2 < -1.0$;

$0.5 < f_1/f < 1.4$; and $-1.5 < f_5/f < -0.3$.

2. The optical system for imaging pickup of claim 1, further comprising a stop, wherein $S_D$ is an axial distance between the stop and the image-side surface of the fifth lens element, $T_D$ is an axial distance between the object-side surface of the first lens element and the image-side surface of the fifth lens element, and the following relation is satisfied:

$0.70 < S_D/T_D < 1.15.$

3. The optical system for imaging pickup of claim 2, wherein the second lens element has negative refractive power.

4. The optical system for imaging pickup of claim 3, wherein the fourth lens element has a convex image-side surface.

5. The optical system for imaging pickup of claim 4, wherein $f_2$ is a focal length of the second lens element, $f_3$ is a focal length of the third lens element, and the following relation is satisfied:

$|f_2/f_3| < 1.5.$

6. The optical system for imaging pickup of claim 5, further comprising an image sensor, wherein ImgH is half of a diagonal length of an effective photosensitive area of the image sensor, f is the focal length of the optical system for imaging pickup, and the following relation is satisfied:

$0.6 < ImgH/f < 1.0.$

7. The optical system for imaging pickup of claim 5, wherein $R_2$ is the curvature radius of the image-side surface of the first lens element, $R_4$ is a curvature radius of the image-side surface of the second lens element, and the following relation is satisfied:

$-2.0 < R_2/R_4 < -0.3.$

8. The optical system for imaging pickup of claim 3, wherein $f_4$ is a focal length of the fourth lens element, f is the focal length of the optical system for imaging pickup, and the following relation is satisfied:

$0.3 < f_4/f < 0.9.$

9. The optical system for imaging pickup of claim 8, wherein the first lens element has a convex object-side surface, the fourth lens element has a concave object-side surface and a convex image-side surface, and the fourth lens element and the fifth lens element are made of plastic.

10. The optical system for imaging pickup of claim 8, wherein $R_1$ is the curvature radius of the object-side surface of the first lens element, $R_2$ is the curvature radius of the image-side surface of the first lens element, and the following relation is satisfied:

$|R_1|/R_2 < -2.0.$

11. The optical system for imaging pickup of claim 8, wherein $f_2$ is a focal length of the second lens element, $f_3$ is a focal length of the third lens element, and the following relation is satisfied:

$|f_2/f_3| < 0.5.$

12. The optical system for imaging pickup of claim 8, wherein f is the focal length of the optical system for imaging pickup, $f_4$ is the focal length of the fourth lens element, $f_5$ is the focal length of the fifth lens element, and the following relation is satisfied:

$3.0 < |f/f_4| + |f/f_5| < 5.0.$

13. The optical system for imaging pickup of claim 3, further comprising an image sensor installed at an image plane for imaging an object, wherein TTL is an axial distance between the object-side surface of the first lens element and the image plane, ImgH is half of a diagonal length of an effective photosensitive area of the image sensor, and the following relation is satisfied:

$TTL/ImgH < 2.1.$

14. An optical system for imaging pickup, sequentially arranged from an object side to an image side, comprising:
a first lens element with positive refractive power, having a convex image-side surface;
a second lens element with refractive power, having a concave image-side surface;
a third lens element with refractive power;
a fourth lens element with positive refractive power, having a convex image-side surface, both object-side surface and image-side surface being aspheric, and at least one of the object-side surface and image-side surface having at least one inflection point; and
a fifth lens element with negative refractive power, having a concave image-side surface, both object-side surface and image-side surface being aspheric, and at least one of the object-side surface and the image-side surface having at least one inflection point, wherein $R_1$ is a curvature radius of the object-side surface of the first lens element, $R_2$ is a curvature radius of the image-side surface of the first lens element, f is a focal length of the optical system for imaging pickup, $f_1$ is a focal length of the first lens element, $f_5$ is a focal length of the fifth lens element, and the following relations are satisfied:

$|R_1|/R_2 < -1.0;$ $0.5 < f_1/f < 1.4;$ and $-1.5 < f_5/f < -0.3.$

15. The optical system for imaging pickup of claim 14, wherein the second lens element has negative refractive power, and the fourth lens element and the fifth lens element are made of plastic.

16. The optical system for imaging pickup of claim 15, wherein, $R_2$ is the curvature radius of the image-side surface of the first lens element, $R_4$ is a curvature radius of the image-side surface of the second lens element, and the following relation is satisfied:

$-2.0 < R_2/R_4 < -0.3.$

17. The optical system for imaging pickup of claim 15, wherein $R_1$ is the curvature radius of the object-side surface of the first lens element, $R_2$ is the curvature radius of the image-side surface of the first lens element, and the following relation is satisfied:

$|R_1|/R_2 < -2.0.$

18. The optical system for imaging pickup of claim 15, wherein the first lens element has a convex object-side surface; f is the focal length of the optical system for imaging pickup, $f_4$ is a focal length of the fourth lens element, $f_5$ is the focal length of the fifth lens element, and the following relation is satisfied:

$3.0 < |f/f_4| + |f/f_5| < 5.0.$

19. An optical system for imaging pickup, sequentially arranged from an object side to an image side, comprising:
a first lens element with positive refractive power, having a convex image-side surface;
a second lens element with negative refractive power;
a third lens element with refractive power;

a fourth lens element with positive refractive power, having both object-side surface and image-side surface being aspheric, and at least one of the object-side surface and the image-side surface having at least one inflection point; and a fifth lens element with negative refractive power, having a concave image-side surface, both object-side surface and image-side surface being aspheric, and at least one of the object-side surface and the image-side surface having at least one inflection point, wherein $R_1$ is a curvature radius of the object-side surface of the first lens element, $R_2$ is a curvature radius of the image-side surface of the first lens element, f is a focal length of the optical system for imaging pickup, $f_1$ is a focal length of the first lens element, $f_4$ is a focal length of the fourth lens element, $f_5$ is a focal length of the fifth lens element, and the following relations are satisfied:

$$|R_1|/R_2 < -1.0;$$

$$0.5 < f_1/f < 1.4;$$

$$0.35 < f_4/f < 0.67; \text{ and}$$

$$-1.5 < f_5/f < -0.3.$$

20. The optical system for imaging pickup of claim 19, further comprising a stop, wherein the fourth lens element has a concave object-side surface and a convex image-side surface; $S_D$ is an axial distance between the stop and the image-side surface of the fifth lens element, $T_D$ is an axial distance between the object-side surface of the first lens element and the image-side surface of the fifth lens element, $f_2$ is a focal length of the second lens element, $f_3$ is a focal length of the third lens element, and the following relations are satisfied:

$$0.7 < S_D/T_D < 1.15; \text{ and}$$

$$|f_2/f_3| < 0.5.$$

21. The optical system for imaging pickup of claim 20, wherein $R_2$ is the curvature radius of the image-side surface of the first lens element, $R_4$ is a curvature radius of the image-side surface of the second lens element, and the following relation is satisfied:

$$-2.0 < R_2/R_4 < -0.3.$$

22. The optical system for imaging pickup of claim 19, further comprising an image sensor, wherein ImgH is half of a diagonal length of an effective photosensitive area of the image sensor, f is the focal length of the optical system for imaging pickup, and the following relation is satisfied:

$$0.6 < \text{ImgH}/f < 1.0.$$

* * * * *